(12) United States Patent
Lee

(10) Patent No.: US 12,510,993 B2
(45) Date of Patent: Dec. 30, 2025

(54) TOUCH DETECTION MODULE AND DISPLAY DEVICE INCLUDING THE SAME

(71) Applicant: SAMSUNG DISPLAY CO., LTD., Yongin-si (KR)

(72) Inventor: Choon Hyop Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/529,727

(22) Filed: Dec. 5, 2023

(65) Prior Publication Data
US 2024/0338094 A1    Oct. 10, 2024

(30) Foreign Application Priority Data

Apr. 5, 2023  (KR) .................. 10-2023-0044745

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0446* (2019.05)

(58) Field of Classification Search
CPC .. G06F 3/04166; G06F 3/0412; G06F 3/0446; G06F 3/03545; G06F 3/016; G06F 3/017; G06F 3/0304; G06F 3/0346
See application file for complete search history.

(56) References Cited

U.S. PATENT DOCUMENTS

| | | | |
|---|---|---|---|
| 10,216,314 B2 | 2/2019 | Kremin et al. | |
| 2012/0062497 A1* | 3/2012 | Rebeschi | G06F 3/0445 345/174 |
| 2014/0139480 A1* | 5/2014 | Seo | G06F 3/0443 345/174 |
| 2015/0035785 A1* | 2/2015 | Singh | G06F 3/0447 345/174 |
| 2018/0011598 A1* | 1/2018 | Ku | G06F 3/04166 |
| 2019/0138148 A1* | 5/2019 | Kwon | G06F 3/0416 |
| 2020/0210025 A1* | 7/2020 | Kim | G06F 3/0443 |
| 2022/0027012 A1* | 1/2022 | Kim | G06F 3/0448 |
| 2022/0208123 A1* | 6/2022 | Kim | G09G 3/3291 |

FOREIGN PATENT DOCUMENTS

| | | |
|---|---|---|
| KR | 10-2016-0070597 | 6/2016 |
| KR | 10-2019-0081532 | 7/2019 |

* cited by examiner

*Primary Examiner* — MD Saiful A Siddiqui
(74) *Attorney, Agent, or Firm* — F. CHAU & ASSOCIATES, LLC

(57) ABSTRACT

The present disclosure relates to a touch detection module and a display device including the same. According to an embodiment, a touch detection module includes driving electrodes arranged in parallel, sensing electrodes arranged to cross the driving electrodes, and a touch driving circuit configured to supply touch driving signals to the driving electrodes and detect touch sensing signals through the sensing electrodes to detect touch position coordinates, wherein the touch driver circuit sorts the driving electrodes into a plurality of touch electrode groups based on distances between the touch driver circuit and the driving electrodes, and sequentially supplies the touch driving signals to the driving electrodes of the touch electrode groups.

19 Claims, 16 Drawing Sheets

TOUCH DETECTION MODULE AND DISPLAY DEVICE INCLUDING THE SAME

CROSS-REFERENCE

This application claims priority under 35 U.S.C. § 119 to Korean Patent Application No. 10-2023-0044745, filed on Apr. 5, 2023 in the Korean Intellectual Property Office, the disclosure of which is herein incorporated by reference in its entirety.

FIELD

The present disclosure generally relates to display technology, and more particularly relates to a touch detection module and a display device including the same.

DISCUSSION

As the information-oriented society evolves, various demands for display devices are increasing. For example, display devices are being employed by a variety of electronic devices such as smart phones, digital cameras, laptop computers, navigation devices, and smart televisions.

Display devices may be flat panel display devices such as a liquid-crystal display device, a field emission display device, and/or an organic light-emitting display device. Among such flat panel display devices, a light-emitting display device includes a light-emitting element that can emit light on its own, so that each of the pixels of the display panel can independently emit light. Accordingly, a light-emitting display device can display images without a backlight unit.

SUMMARY

A display device may include a touch detection module for sensing a user's touch as one of various interface means. A touch detection module may include a touch sensing unit in which touch electrodes are arranged, and a touch driver circuit that detects a change in the capacitance among the touch electrodes. The touch detection module may be integrally formed on or may be mounted on a part of the display device where images are displayed.

Embodiments of the present disclosure may provide a touch detection module that can set the numbers of touch driving electrodes substantially simultaneously driven so that different touch sensing areas include different numbers of touch driving electrodes based on deviations in distance between the touch sensing areas and a touch driver circuit, and a display device including the same.

Embodiments of the present disclosure may also provide a touch detection module that can vary touch driving signals to supply touch driving electrodes for each touch sensing area, and a display device including the same.

It should be noted that objects of the present disclosure are not limited to the above-mentioned object; and other objects of the present disclosure will be apparent to those skilled in the art from the following descriptions.

According to an embodiment of the disclosure, a touch detection module comprising driving electrodes arranged in parallel, sensing electrodes arranged to cross the driving electrodes, and a touch driver circuit configured to supply touch driving signals to the driving electrodes and detect touch sensing signals through the sensing electrodes to determine touch position coordinates, wherein the touch driver circuit sorts the driving electrodes into a plurality of touch electrode groups based on distances between the touch driver circuit and the driving electrodes, and sequentially supplies the touch driving signals to the driving electrodes of the touch electrode groups.

In an embodiment, the touch driver circuit sets a number of driving electrodes that are substantially simultaneously driven by receiving the touch driving signals, and forms touch electrode groups comprising the set number of the driving electrode, and wherein areas in which the touch electrode groups are located are distinguished into divided areas.

In an embodiment, the touch driver circuit comprises a driving signal output configured to modulate at least one signal characteristics among supply period, frequency band and voltage level of the touch drive signals to supply the touch driving signals to driving electrodes of each of the touch electrode groups, a sensing circuit configured to detect the touch sensing signals through the sensing electrodes, a touch driving controller configured to generate signal characteristic modulation signals such that at least one signal characteristic among the supply period, the frequency band and the voltage level of the touch driving signals is modulated to control driving of the driving signal output, and an electrode group setter configured to set the number of the driving electrodes substantially simultaneously driven by the touch driving signals and the touch electrode groups, and to share touch electrode group information.

In an embodiment, the touch driver circuit sets the first to nth touch electrode groups so that the number of driving electrodes substantially simultaneously driven decreases as the driving electrodes are relatively closer to the touch driver circuit, and the number of driving electrodes substantially simultaneously driven increases as the driving electrodes are farther from the touch driver circuit.

In an embodiment, the touch driver circuit sets an overlap area at least one boundary among boundaries of the first to nth touch electrode groups, driving periods of the driving electrodes overlapping one another in the overlap area, and wherein the driving electrodes disposed in the overlap area are driven by receiving the touch driving signals together with the driving electrodes of previous touch electrode groups, and are continuously driven by receiving the touch driving signals together with the driving electrodes of a current touch electrode group.

In an embodiment, the touch driver circuit modulates at least one signal characteristic among supply period, frequency band or voltage level of the touch driving signals supplied to the driving electrodes of each of the first to nth touch electrode groups.

In an embodiment, the touch driver circuit divides supply periods of the touch driving signals supplied to the driving electrodes of each of the first to nth touch electrode groups into first to nth periods from a shortest period to a longest period within at least one frame, generates first to nth period characteristic modulation signals for the different first to nth periods, respectively, and supplies the first to nth touch driving signals in the different first to nth periods, respectively, to the driving electrodes of each of the first to nth touch electrode groups.

In an embodiment, the touch driver circuit divides frequency bands of the touch driving signals supplied to the driving electrodes of each of the first to nth touch electrode groups into first to nth frequency bands from predetermined lowest frequency band to highest frequency band, generates first to nth frequency characteristic modulation signals for the different first to nth frequency bands, respectively, and supplies the first to nth touch driving signals of the different first to nth frequency bands, respectively, to the driving electrodes of each of the first to nth touch electrode groups.

In an embodiment, the touch driver circuit divides voltage levels of the touch driving signals supplied to the driving electrodes of each of the first to nth touch electrode groups into first to nth voltage levels from predetermined lowest voltage to highest voltage, generates first to nth voltage characteristic modulation signals for the different first to nth voltage levels, respectively, and supplies the first to nth touch driving signals of the different first to nth voltage levels, respectively, to the driving electrodes of each of the first to nth touch electrode groups.

In an embodiment, the touch driver circuit divides voltage levels of the touch driving signals supplied to the driving electrodes of each of the first to nth touch electrode groups into first to nth voltage levels from predetermined lowest voltage to highest voltage, divides frequency bands of the touch driving signals supplied to the driving electrodes of each of the first to nth touch electrode groups into first to nth frequency bands from predetermined lowest frequency band to highest frequency band, generates first to nth complex characteristic modulation signals for the different first to nth frequency bands and the different first to nth voltage levels, respectively, and supplies the first to nth touch driving signals of the different first to nth voltage levels and the different first to nth frequency bands, respectively, to the driving electrodes of each of the first to nth touch electrode groups.

According to an embodiment of the disclosure, a display device comprising a display panel comprising a display area in which a plurality of sub-pixels is arranged, and a touch detection module disposed on a front surface of the display panel to sense a user's touch, wherein the touch detection module comprises driving electrodes arranged in parallel, sensing electrodes arranged to cross the driving electrodes, and a touch driving circuit configured to supply touch driving signals to the driving electrodes and detect touch sensing signals through the sensing electrodes to detect touch position coordinates, and wherein the touch driver circuit sorts the driving electrodes into a plurality of touch electrode groups based on distances between the touch driver circuit and the driving electrodes, and sequentially supplies the touch driving signals to the driving electrodes of the touch electrode groups.

In an embodiment, the touch driver circuit comprises a driving signal output configured to modulate at least one signal characteristics among supply period, frequency band and voltage level of the touch drive signals to supply the touch driving signals to driving electrodes of each of the touch electrode groups, a sensing circuit configured to detect the touch sensing signals through the sensing electrodes, a touch driving controller configured to generate signal characteristic modulation signals such that at least one signal characteristic among the supply period, the frequency band and the voltage level of the touch driving signals is modulated to control driving of the driving signal output, and an electrode group setter configured to set the number of the driving electrodes substantially simultaneously driven by the touch driving signals and the touch electrode groups, and to share touch electrode group information.

In an embodiment, the touch driver circuit sets the first to nth touch electrode groups so that the number of driving electrodes substantially simultaneously driven decreases as the driving electrodes are relatively closer to the touch driver circuit, and the number of driving electrodes substantially simultaneously driven increases as the driving electrodes are farther from the touch driver circuit.

In an embodiment, the touch driver circuit sets an overlap area at least one boundary among boundaries of the first to nth touch electrode groups, driving periods of the driving electrodes overlapping one another in the overlap area, and wherein the driving electrodes disposed in the overlap area are driven by receiving the touch driving signals together with the driving electrodes of previous touch electrode groups, and are continuously driven by receiving the touch driving signals together with the driving electrodes of a current touch electrode group.

In an embodiment, the touch driver circuit modulates at least one signal characteristic among supply period, frequency band and voltage level of the touch driving signals supplied to the driving electrodes of each of the first to nth touch electrode groups.

In an embodiment, the touch driver circuit divides supply periods of the touch driving signals supplied to the driving electrodes of each of the first to nth touch electrode groups into first to nth periods from a shortest period to a longest period within at least one frame, generates first to nth period characteristic modulation signals for the different first to nth periods, respectively, and supplies the first to nth touch driving signals in the different first to nth periods, respectively, to the driving electrodes of each of the first to nth touch electrode groups.

In an embodiment, the touch driver circuit divides frequency bands of the touch driving signals supplied to the driving electrodes of each of the first to nth touch electrode groups into first to nth frequency bands from predetermined lowest frequency band to highest frequency band, generates first to nth frequency characteristic modulation signals for the different first to nth frequency bands, respectively, and supplies the first to nth touch driving signals of the different first to nth frequency bands, respectively, to the driving electrodes of each of the first to nth touch electrode groups.

In an embodiment, the touch driver circuit divides voltage levels of the touch driving signals supplied to the driving electrodes of each of the first to nth touch electrode groups into first to nth voltage levels from predetermined lowest voltage to highest voltage, divides frequency bands of the touch driving signals supplied to the driving electrodes of each of the first to nth touch electrode groups into first to nth frequency bands from predetermined lowest frequency band to highest frequency band, generates first to nth complex characteristic modulation signals for the different first to nth frequency bands and the different first to nth voltage levels, respectively, and supplies the first to nth touch driving signals of the different first to nth voltage levels and the different first to nth frequency bands, respectively, to the driving electrodes of each of the first to nth touch electrode groups.

According to an embodiment of the present disclosure, it is possible to reduce deviations in touch sensing signals and to increase the accuracy of touch detection in touch detection module of a display device by way of setting the numbers of touch driving electrodes substantially simultaneously driven so that different touch sensing areas includes different numbers of touch driving electrodes.

According to an embodiment of the present disclosure, it is possible to reduce noise effect and deviations in touch sensing signals of different touch sensing areas in a touch detection module of a display device by way of varying touch driving signals of touch driving electrodes for the different touch sensing areas.

According to an embodiment of the present disclosure, a method of driving a display device having a touch driver circuit, driving electrodes, and sensing electrodes is provided, the method comprising: sorting the driving electrodes into a plurality of touch electrode groups based on distances between the touch driver circuit and the driving electrodes, respectively; sequentially supplying the touch driving signals to each touch electrode group, respectively, within which group the touch driving signals are substantially simultaneously applied to the driving electrodes of said group; detecting touch sensing signals through the sensing electrodes; and determining touch position coordinates based on the detected touch sensing signals.

In an embodiment, setting each of the plurality of touch electrode groups is performed to include a respective number of driving electrodes to be substantially simultaneously driven that varies substantially inversely with the distance of said driving electrodes from the touch driver circuit.

It should be noted that embodiments of the present disclosure are not limited to those described above, and other embodiments of the present disclosure will become apparent to those skilled in the art from reading the following descriptions.

BRIEF DESCRIPTION OF THE DRAWINGS

The above and other embodiments of the present disclosure will become more apparent by describing in detail embodiments thereof with reference to the attached drawings, in which.

DETAILED DESCRIPTION

The present disclosure is described more fully hereinafter by way of example with reference to the accompanying drawings, in which illustrative embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

It will be understood that when a layer is referred to as being "on" another layer or substrate, it can be directly on the other layer or substrate, or intervening layers may also be present. The same reference numbers indicate the same components throughout the specification.

It will also be understood that, although the terms "first," "second," . . . etcetera, may be used herein to describe various elements, these elements should not be limited by these terms. These terms may be used to distinguish one element from another element. For instance, a first element discussed below could be termed a second element without departing from the teachings of the present disclosure. Similarly, the second element could also be termed the first element.

Each of the various embodiments of the present disclosure may be modified or combined with each other, in part or in whole, and technically various interlocking and driving are contemplated. Each embodiment may be implemented independently of each other, or some may be implemented together in an association.

Hereinafter, embodiments of the present disclosure will be described with reference to the accompanying drawings.

Figure 1:
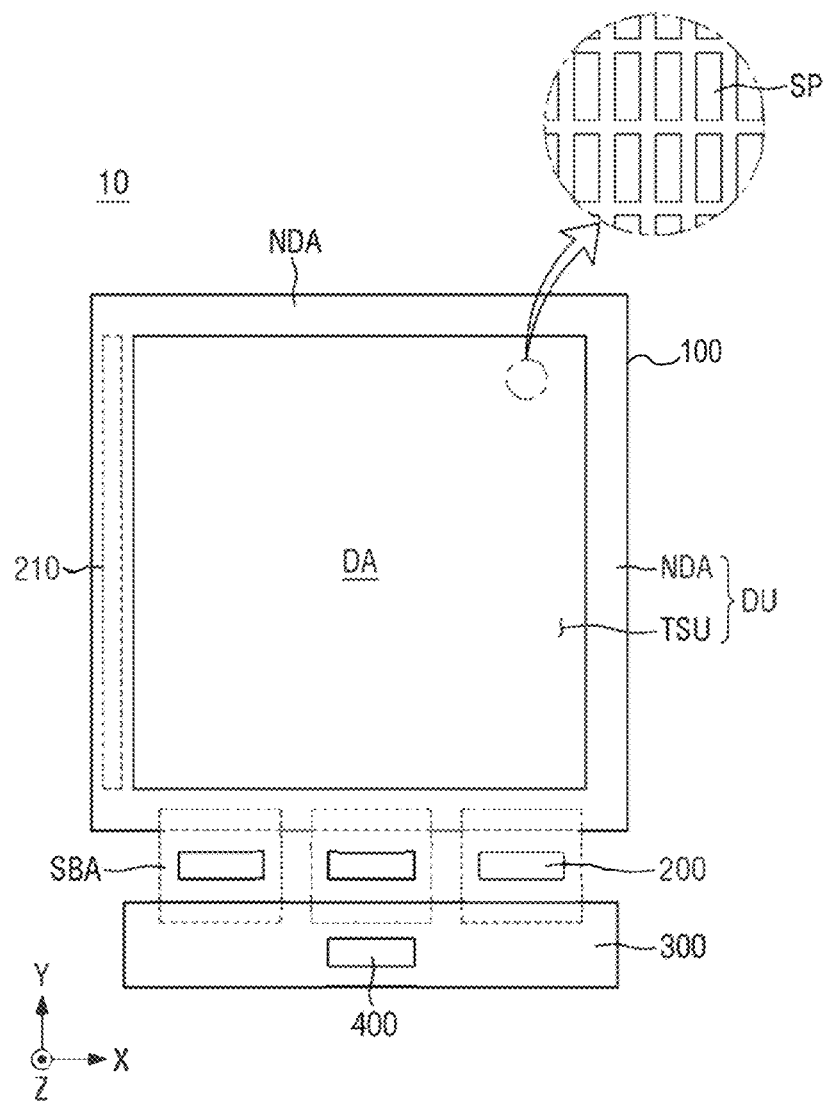
FIG. 1 is a plan view diagram showing the configuration of a display device according to an embodiment of the present disclosure.
Figure 2:
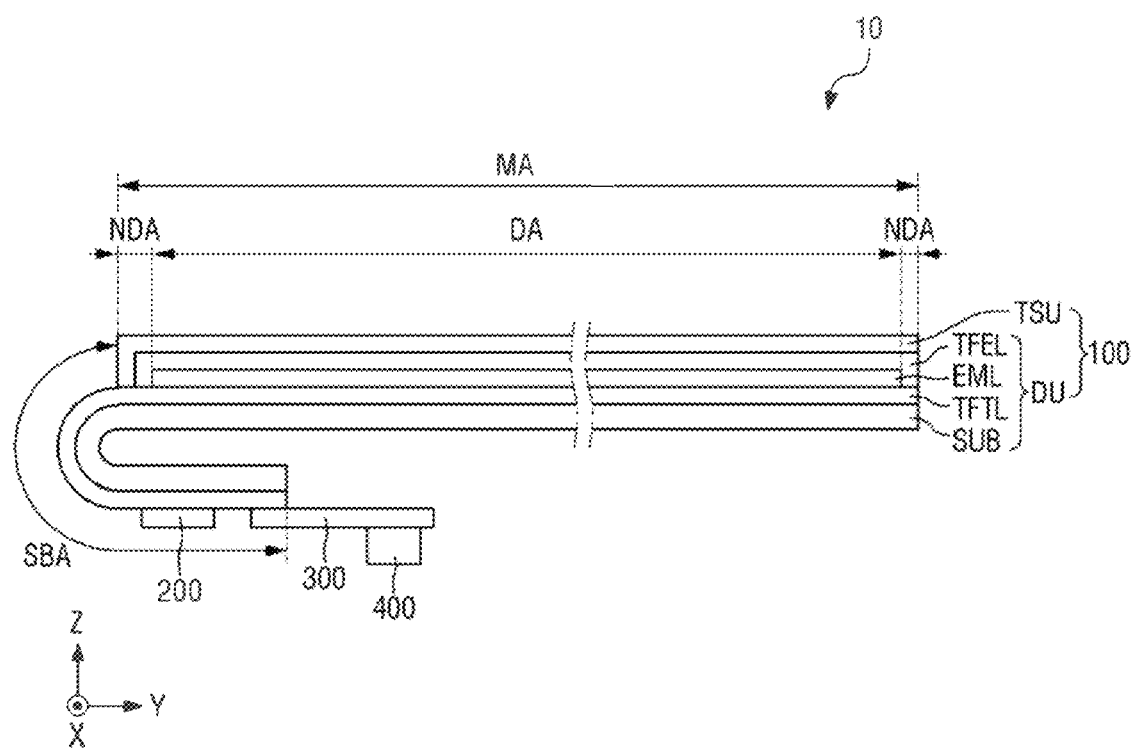
FIG. 2 is a cross-sectional view diagram showing a side of the display device of FIG. 1 in detail.

FIG. 1 shows the configuration of a display device according to an embodiment of the present disclosure. FIG. 2 shows a side of the display device of FIG. 1 in greater detail.

Referring to FIGS. 1 and 2, a display device 10 according to an embodiment of the present disclosure may be employed by portable electronic devices such as a tablet PC, a portable multimedia player (PMP), a navigation device, an ultra-mobile PC (UMPC), an electronic notebook, an electronic book, a mobile phone, a smartphone, a mobile communications terminal, or the like. For example, the display device 10 may be used as a display unit of a television, a laptop computer, a monitor, an electronic billboard, or an Internet of Things (IoT) device.

The display device 10 may be variously classified by the way in which images are displayed. For example, the display device 10 may be classified into and implemented as an organic light-emitting diode (OLED) display device, an inorganic light-emitting diode (inorganic LED) display device. an inorganic electroluminescence (inorganic EL) display device, a quantum-dot light-emitting display device (QED), a micro LED display device (micro-LED), a nano LED display device (nano-LED), a plasma display device (PDP), a field emission display device (FED), a liquid-crystal display device (LCD), an electrophoretic display device (EPD), or the like. In the following description, an organic light-emitting diode display device (OLED) may be described as an embodiment of the display device. The organic light-emitting disposed display device OLED may be referred to as the display device 10 unless otherwise stated. It is, however, to be understood that the embodiments of the present disclosure are not limited to the organic light-emitting diode display device (OLED), and one of the above-listed display devices or any other display device well known in the art may be employed as the display device 10 without departing from the scope of the present disclosure.

According to this embodiment of the present disclosure, the display device 10 may have a rectangular shape. In alternate embodiments, the display device may have a square shape, a circular shape, an elliptical shape or a quadrangular shape when viewed from the top, without limitation thereto.

For example, when the display device 10 is a mobile device such as a tablet PC, it may have a rectangular shape in which the longer sides are located in the horizontal direction. It should be understood, however, that the present disclosure is not limited thereto. The longer side may be positioned in the vertical direction. Alternatively, the display device 1 may be installed rotatably so that the longer sides are variably positioned in the horizontal or vertical direction.

The display device 10 includes a display panel 100, a display driver circuit 200, and a touch sensing module including a touch sensing unit TSU and a touch driver circuit 400.

The display panel 100 of the display device 10 may include a display unit DU to display images, and a touch sensing unit TSU is disposed on the display panel 100 to sense a part of a human body and/or an electronic pen, without limitation thereto. The display unit DU of the display panel 100 may include a plurality of sub-pixels SP in the display area DA and may display images through the plurality of sub-pixels SP. The touch sensing unit TSU may be mounted on the front surface of the display panel 100 or formed integrally with the display panel 100. The touch sensing unit TSU may include a plurality of touch electrodes to sense a user's touch by capacitive sensing using the touch electrodes.

The display driver circuit 200 may output signals and voltages for driving each sub-pixel SP in the display unit DU. The display driver circuit 200 may supply data voltages to data lines connected to the sub-pixels SP. The display driver circuit 200 may apply a supply voltage to a voltage line and may supply gate control signals to a gate driver 210.

The touch driver circuit 400 may be electrically and physically connected to the touch sensing unit TSU. The touch driver circuit 400 may supply touch driving signals to a plurality of touch electrodes arranged in the touch sensing unit TSU and may sense a change in the capacitance among Dot the plurality of touch electrodes. The touch driver circuit 400 may determine whether a user's touch is input, and may find the coordinates of the touch based on the amount of a change in the capacitance among the touch electrodes. The configuration and operational characteristics of the touch driver circuit 400 may be described in greater detail further below.

The display driver circuit 200 may operate as a main or auxiliary processor, or may be formed integrally with the main processor. Accordingly, the display driver circuit 200 may control overall functions of the display device 10. For example, the display driver circuit 200 may receive touch data from the touch driver circuit 400 to determine the user's touch coordinates, and then may generate digital video data based on the touch coordinates. In addition, the display driver circuit 200 may run an application, such as but not limited to an application indicated by an icon displayed at the user's touch coordinates. For another example, the display driver circuit 200 may receive coordinate data from an electronic pen to determine the touch coordinates of the electronic pen, and then may generate digital video data according to the touch coordinates or may run an application indicated by an icon displayed at the touch coordinates of the electronic pen.

Referring to FIG. 2, the display panel 100 may be divided into a main area MA and a subsidiary area SBA. The main area MA may include the display area DA where the sub-pixels SP for displaying images are disposed, and a non-display area NDA located around the display area DA. In the display area DA, light may be emitted from an emission area or an opening area of each of the sub-pixels SP to display an image. For example, each of the sub-pixels SP in the display device DA may include a pixel circuit including switching elements, a pixel-defining layer that defines the emission area or the opening area, and a self-light-emitting element.

The non-display area NDA may be or include an edge or an outer area of the display area DA. The non-display area NDA may be defined as the edge area of the main area MA of the display panel 100. In the non-display area NDA, a gate driver that applies gate signals to gate lines, and fan-out lines that connect the display driver circuit 200 with the display area DA may be formed.

The subsidiary area SBA may extend from one side of the main area MA. The subsidiary area SBA may include a flexible material that can be bent, folded, or rolled. For example, when the subsidiary area SBA is bent, the subsidiary area SBA may overlap the main area MA in the thickness direction (e.g., a z-axis direction). The subsidiary area SBA may include pads connected to the display driver circuit 200 and the circuit board 300. Optionally, the subsidiary area SBA may be eliminated, and the display driver circuit 200 and the pads may be disposed in the non-display area NDA.

One or more display driver circuits 200 may be implemented as an integrated circuit (IC) and may be attached on the display panel 100 by a chip-on-glass (COG) technique, a chip-on-plastic (COP) technique, or ultrasonic bonding. For example, the display driver circuit 200 may be disposed in the subsidiary area SBA and may overlap with the main area MA in the thickness direction (e.g., the z-axis direction) as the subsidiary area SBA is bent. For another example, the display driver circuit 200 may be mounted on the circuit board 300.

The circuit board 300 may be electrically connected to the pads of the display panel 100 by an anisotropic conductive film (ACF). For example, lead lines of the circuit board 300 may be electrically connected to the pads of the display panel 100. The circuit board 300 may be a flexible printed circuit board (FPCB), a printed circuit board (PCB), or a flexible film such as a chip-on-film (COF).

The touch driver circuit 400 may be mounted on a separate circuit board. The touch driver circuit 400 may be implemented as an integrated circuit (IC). As described above, the touch driver circuit 400 applies touch driving signals to the touch electrodes of the touch sensing unit TSU. In addition, the amount of change in the mutual capacitance of each of the touch nodes formed at the intersections of the touch electrodes is measured.

The touch driver circuit 400 measures a change in capacitance of the touch nodes according to a change the amount of voltage or current of touch sensing signals received through the touch electrodes. In this manner, the touch driver circuit 400 may determine whether there is a user's touch or near proximity, based on the amount of a change in the mutual capacitance of each of the touch nodes. The touch driving signal may be a pulse signal having a predetermined frequency. The touch driver circuit 400 may determine whether there is touch by a part of a user's body such as a finger and may find the coordinates of the touch, if any, based on the amount of the change in the capacitance among the touch electrodes.

The touch driver circuit 400 may sequentially supply touch driving signals to the touch electrodes arranged in the touch sensing unit TSU to cross one another, and may sequentially measure the amount of change in the capacitance of each of the touch nodes formed as the touch electrodes cross one another, to detect whether there is a user's touch.

On the other hand, the touch driver circuit 400 may detect the position of the user's touch by driving the touch electrodes of the touch sensing unit TSU by code division multiplexing (CDM). The touch driver circuit 400 divides a touch sensing area of the touch sensing unit TSU into a plurality of divided areas according to distances from the touch driver circuit 400. Then, the touch electrodes included in each of the divided areas are sorted into at least one group. Then, by substantially simultaneously supplying touch driving signals to the touch electrodes of each group of each of the divided areas to measure the amount of change in the capacitance through the touch electrodes of each group, it is possible to detect the touch position by a finger or an electronic pen.

By sequentially supplying the touch driving signals to the touch electrodes of each group of the touch sensing unit TSU to sense a touch position, it is possible to reduce the effects of electro-magnetic interference (EMI) from the outside. In particular, by setting the number of touch electrodes that are substantially simultaneously driven to form touch electrode groups and substantially simultaneously supplying the touch driving signals to the touch electrodes of each group to detect a touch position, it is possible to shorten the time taken to detect a touch. Accordingly, the number of times of touch detection can be increased, so that the accuracy of the touch detection can be improved.

In this regard, since the distances between the touch driver circuit 400 and the divided areas are different from one another, the distances between the touch driver circuit 400 and the touch electrode groups in the divided areas may also be different from one another. Accordingly, deviations in the lengths and resistances of touch driving lines that are connected to the touch electrodes of the touch electrode groups for each divided area and transmit the touch driving signals may vary depending on the distances between the touch driver circuit 400 and the touch electrode groups. Alternatively, deviations in the length and resistance of touch sensing lines that are connected to the touch electrodes of the touch electrode groups for each divided area and transmit the touch sensing signals may vary depending on the distances between the touch driver circuit 400 and the touch electrode groups.

Since the resistance increases as the lengths of the touch driving lines or the driving signal output increase, touch driving signals or touch sensing signals transmitted from the touch electrode groups disposed relatively close to the touch driver circuit 400 can be large and strong without distortion. If the lengths of the touch driving lines or the touch sensing lines are short, the noise effect can also be reduced. On the other hand, touch driving signals or touch sensing signals transmitted from the touch electrode groups disposed farther from the touch driver circuit 400 are smaller and weaker as the distance increases. If the lengths of the touch driving lines or the touch sensing lines are long, the noise effect can also be increased.

To reduce distortions and deviations in the signal magnitude of touch driving signals or touch sensing signals caused by deviations in the distances between the touch driver circuit 400 and the touch electrode groups, the touch driver circuit 400 may set the numbers of touch electrodes so that different touch electrode groups have different number of touch electrodes that are substantially simultaneously driven. In addition, the touch driving circuit 400 may vary signal characteristics, such as supply period, frequency band and voltage level or amplitude, of touch driving signals for each divided area or each touch electrode group to supply the respective touch driving signals to the touch electrodes of each group.

The driving characteristics and driving schemes of the touch driving circuit 400 may be described in greater detail further below with reference to the accompanying drawings.

The substrate SUB of the display panel 100 shown in FIG. 2 may be a base substrate or a base member. The substrate SUB may be a flexible substrate that can be bent, folded, or rolled. For example, the substrate SUB may include, but is not limited to, a glass material or a metal material. As another example, the substrate SUB may include a polymer resin such as polyimide (PI).

The thin-film transistor layer TFTL may be disposed on the substrate SUB. The thin-film transistor layer TFTL may include a plurality of thin-film transistors forming pixel circuits of the sub-pixels SP. The thin-film transistor layer TFTL may include gate lines, data lines, voltage lines, gate control lines, fan-out lines for connecting the display driver circuit 200 with the data lines, lead lines for connecting the display driver circuit 200 with the pads, or the like. When the gate driver 210 is formed on one side of the non-display area NDA of the display panel 100, the gate driver 210 may include thin-film transistors.

The thin-film transistor layer TFTL may be disposed in the display area DA, the non-display area NDA and/or the subsidiary area SBA. The thin-film transistors in each of the pixels, the gate lines, the data lines and the voltage lines in the thin-film transistor layer TFTL may be disposed in the display area DA. The gate control lines and the fan-out lines in the thin-film transistor layer TFTL may be disposed in the non-display area NDA. The lead lines of the thin-film transistor layer TFTL may be disposed in the subsidiary area SBA.

The emission material layer EML may be disposed on the thin-film transistor layer TFTL. The emission material layer EML may include a plurality of light-emitting elements, each of which may include a first electrode, an emissive layer and a second electrode stacked on one another to emit light, and a pixel-defining layer for defining the pixels. The plurality of light-emitting elements in the emission material layer EML may be disposed in the display area DA.

An encapsulation layer TFEL may cover the upper and side surfaces of the emission material layer EML, and may protect the emission material layer EML. The encapsulation layer TFEL may include at least one inorganic layer and at least one organic layer for encapsulating the emission material layer EML.

The touch sensing unit TSU may be disposed on the encapsulation layer TFEL. The touch sensing unit TSU may include a plurality of touch electrodes for sensing a user's touch such as by capacitive sensing, and touch lines connecting the plurality of touch electrodes with the touch driver circuit 400. For example, the touch sensor unit TSU may sense a user's touch by self-capacitance sensing or mutual capacitance sensing, without limitation thereto.

For example, the touch sensing unit TSU may be disposed on a separate substrate disposed on the display unit DU. In such an embodiment, the substrate supporting the touch sensing unit TSU may be a base member encapsulating the display unit DU.

The plurality of touch electrodes included for the touch sensing unit TSU may be disposed in the touch sensing area overlapping the display area DA. The touch lines of the touch sensing unit TSU may be disposed in a touch peripheral area overlapping the non-display area NDA.

Figure 3:
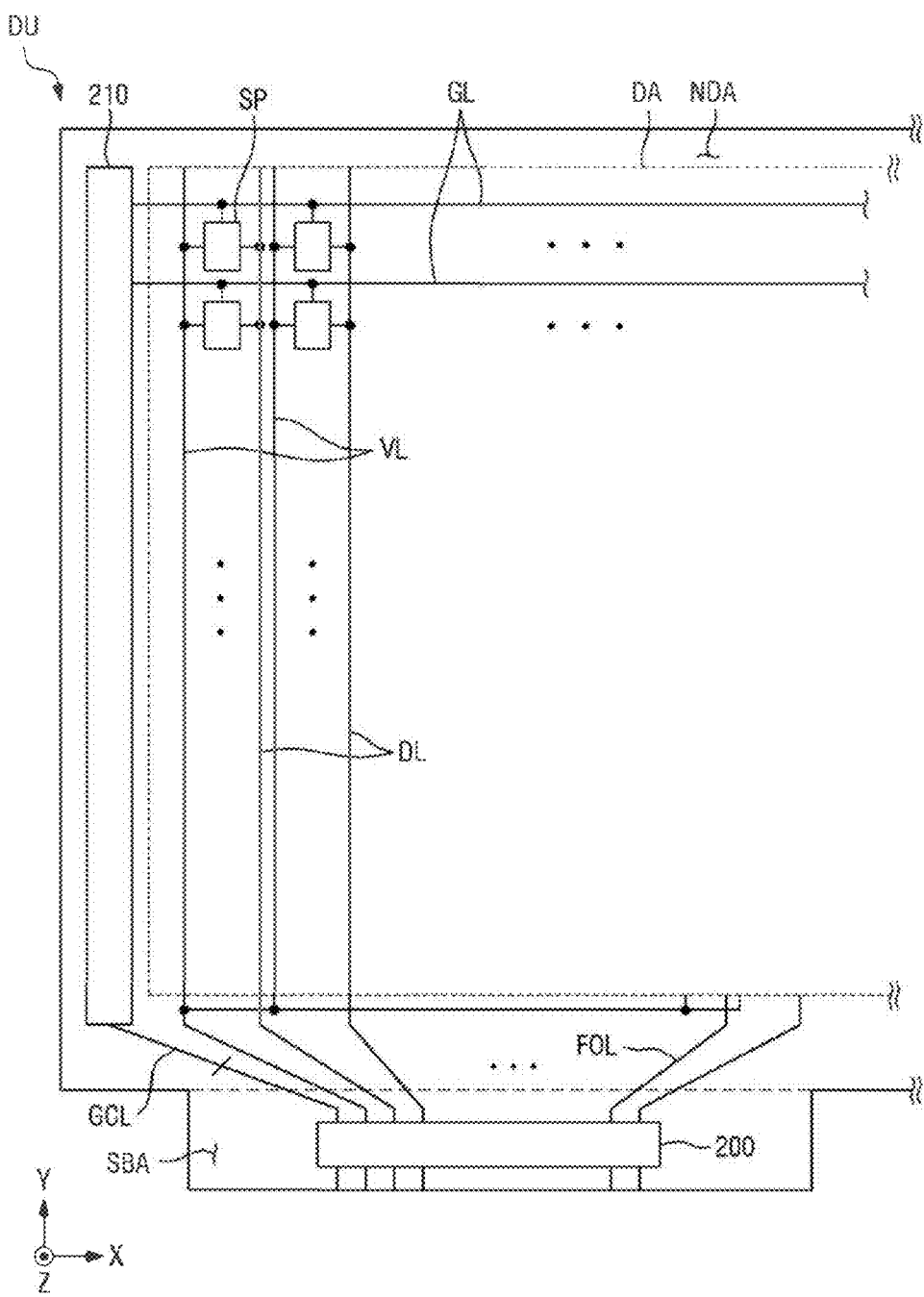
FIG. 3 is a circuit diagram showing an example of a layout of a display panel according to an embodiment of the present disclosure.

FIG. 3 shows an example of a layout of a display panel according to an embodiment of the present disclosure. FIG. 3 shows a layout view of the display area DA and the non-display area NDA of the display unit DU before the touch sensing unit TSU is formed.

The display area DA displays images therein, and may be defined as a central area of the display panel 100. The display area DA may include a plurality of sub-pixels SP, a plurality of gate lines GL, a plurality of data lines DL, and a plurality of voltage lines VL. Each of the plurality of sub-pixels SP may be defined as a minimum unit that outputs light.

The plurality of gate lines GL may supply the gate signals received from the gate driver 210 to the plurality of sub-pixels SP. The plurality of gate lines GL may be extended in the x-axis direction and may be spaced apart from one another in the y-axis direction crossing the x-axis direction, without limitation thereto.

The plurality of data lines DL may supply the data voltages received from the display driver circuit 200 to the plurality of sub-pixels SP. The plurality of data lines DL may be extended in the y-axis direction and may be spaced apart from one another in the x-axis direction, without limitation thereto.

The plurality of voltage lines VL may supply the supply voltages received from the display driver circuit 200 to the plurality of pixels SP. Each supply voltage may be at least one of a driving voltage, an initialization voltage, and a reference voltage. The plurality of voltage lines VL may be extended in the y-axis direction and may be spaced apart from one another in the x-axis direction, without limitation thereto.

The non-display area NDA may surround the display area DA. The non-display area NDA may include the gate driver 210, fan-out lines FOL, and gate control lines GCL. The gate driver 210 may generate a plurality of gate signals based on the gate control signal, and may substantially sequentially supply the plurality of gate signals to the plurality of gate lines GL in a predetermined order.

The fan-out lines FOL may be extended from the display driver circuit 200 to the display area DA. The fan-out lines FOL may supply the data voltage received from the display driver circuit 200 to the plurality of data lines DL.

The gate control lines GCL may be extended from the display driver circuit 200 to the gate driver 210. The gate control line GCL may supply the gate control signal received from the display driver circuit 200 to the gate driver 210.

The display driver circuit 200 may output signals and voltages for driving the display panel 100 to the fan-out lines FOL. The display driver circuit 200 may provide data voltages to the data lines DL through the fan-out lines FOL. The data voltages may be applied to the plurality of sub-pixels SP, so that the luminance of the plurality of sub-pixels SP may be determined. The display driver circuit 200 may supply a gate control signal to the gate driver 210 through the gate control line GCL.

Figure 4:
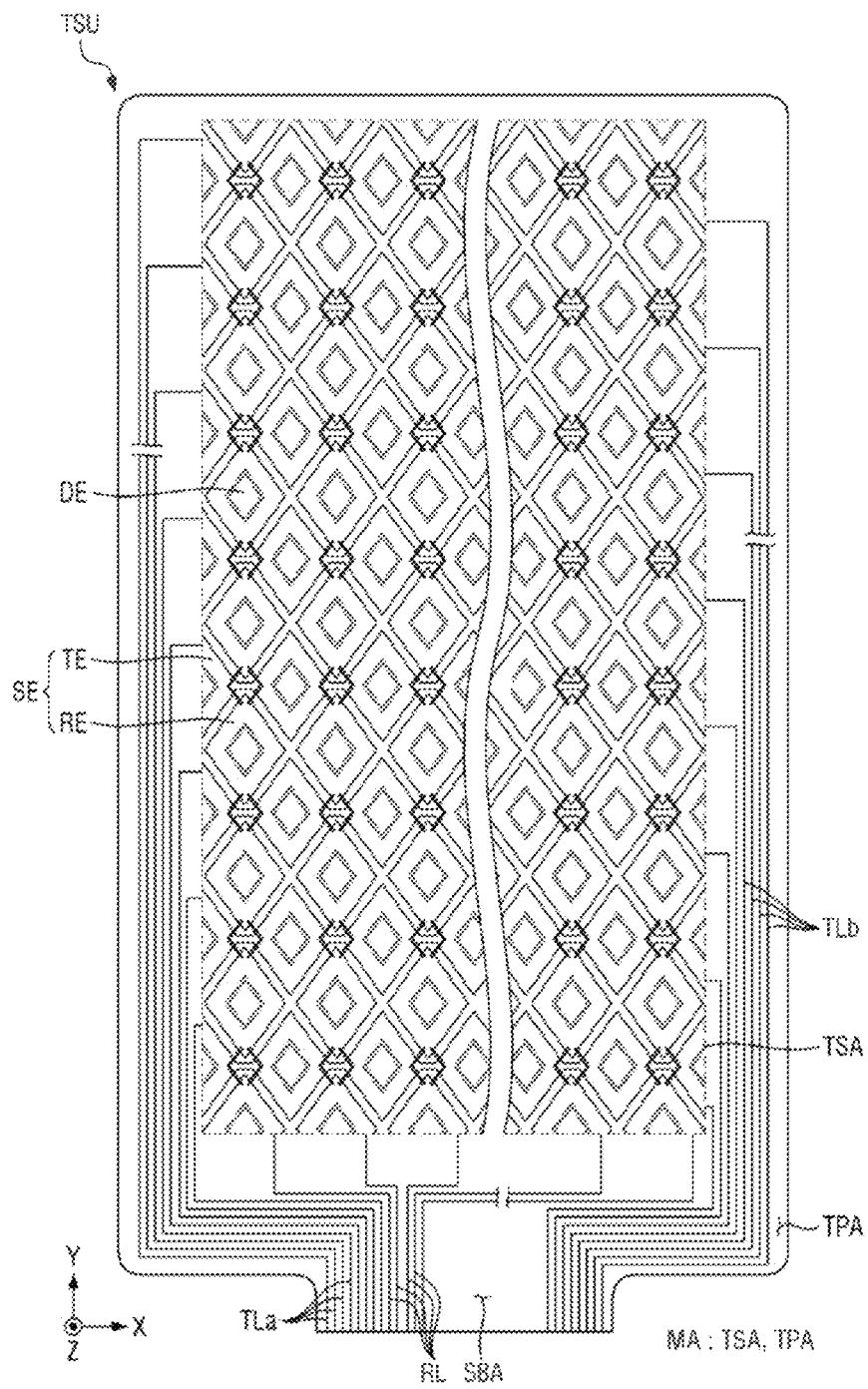
FIG. 4 is a circuit diagram showing an example of a layout of a touch detection module according to an embodiment of the present disclosure.

FIG. 4 shows an example of a layout of a touch detection module according to an embodiment of the present disclosure.

In the embodiment shown in FIG. 4, the touch electrodes SE of the main area MA include two kinds of electrodes, e.g., the driving electrodes TE and the sensing electrodes RE. The mutual capacitive sensing is carried out by sensing the amount of change in the mutual capacitance of each of the touch nodes using the driving electrodes TE and the sensing electrodes RE. For example, after applying touch driving signals to the driving electrodes TE arranged in the touch sensing area TSA, the sensing signals fed back from the driving electrodes TE and the touch sensing signals sensed through the sensing electrodes RE are detected and analyzed, to sense the amount of change in the capacitance of each of the touch nodes. It should be understood, however, that the driving method by the mutual capacitive sensing is not limited to the method described above.

For convenience of illustration, FIG. 4 merely shows some of touch electrodes SE consisting of the driving electrodes TE and the sensing electrodes RE, dummy patterns DE, and touch lines TLa, TLb and RL.

The main area MA of the touch sensing unit TSU includes a touch sensing area TSA for sensing a user's touch, and a touch peripheral area TPA disposed around the touch sensing area TSA. The touch sensing area TSA may overlap the display area DA of FIGS. 1 to 3, and the touch peripheral area TPA may overlap the non-display area NDA.

In the touch sensing area TSA, the driving electrodes TE, the sensing electrodes RE and the dummy patterns DE are disposed. The driving electrodes TE and the sensing electrodes RE may be electrodes for forming mutual capacitance to sense a touch of an object or a person.

The driving electrodes TE may be arranged in the first direction (e.g., the x-axis direction) and second direction (e.g., the y-axis direction). The driving electrodes TE may be electrically connected to one another in the first direction (e.g., the x-axis direction). The driving electrodes TE may be connected to one another in the first direction (e.g., the x-axis direction). The driving electrodes TE adjacent to one another in the second direction (e.g., the y-axis direction) may be electrically separated from one another. Accordingly, touch nodes where mutual capacitance is formed may be disposed at intersections of the driving electrodes TE and the sensing electrodes RE. A plurality of touch nodes may be associated with the intersections of the driving electrodes TE and the sensing electrodes RE, respectively.

The sensing electrodes RE may be arranged in the first direction (e.g., the x-axis direction) and second direction (e.g., the y-axis direction). The sensing electrodes RE adjacent to one another in the first direction (e.g., the x-axis direction) may be electrically separated from one another. The sensing electrodes RE may be electrically connected to one another in the second direction (e.g., the y-axis direction). The sensing electrodes RE adjacent to one another in the second direction (e.g., the y-axis direction) may be connected through separate connection electrodes.

Each of the dummy patterns DE may be surrounded by the driving electrode TE or the sensing electrode RE. Each of the dummy patterns DE may be electrically separated from the driving electrode TE or the sensing electrode RE. Each of the dummy patterns DE may be spaced apart from the driving electrode TE or the sensing electrode RE. Each of the dummy patterns DE may be electrically floating.

In FIG. 4, the driving electrodes TE, the sensing electrodes RE and the dummy patterns DE each have a diamond shape when viewed from the top, but the present disclosure is not limited thereto. For example, each of the driving electrodes TE, the sensing electrodes RE and the dummy patterns DE may have other quadrangular shape than a diamond, other polygonal shapes than a quadrangular shape, a circle or an ellipse when viewed from the top.

The touch lines TLa, TLb and RL may be disposed in the sensor peripheral area TPA. The touch lines TLa, TLb and RL include first touch driving lines TLa and second touch driving lines TLb connected to the driving electrodes TE, and touch sensing lines RL connected to one side of the sensing electrodes RE.

The sensing electrodes RE disposed relatively closest to the touch driver circuit 400 in the touch sensing area TSA may be connected to the touch sensing lines RL, respectively. For example, some of the sensing electrodes RE electrically connected with one another in the second direction (e.g., the y-axis direction) that are disposed at the lower end relatively closest to the touch driver circuit 300 may be connected to the sensing lines RL, respectively, as shown in FIG. 4. Each of the touch sensing lines RL may be electrically connected to the touch driver circuit 400 through a separate pad.

The driving electrodes TE disposed at one end of the touch sensor area TSA may be connected to the first driving lines TLa, respectively, while the driving electrodes TE disposed at the opposite end of the touch sensor area TSA may be connected to the second driving lines TLb, respectively. For example, some of the driving electrodes TE electrically connected to one another in the first direction (e.g., the x-axis direction) that are disposed at one end may be connected to the first touch driving lines TLa, respectively, while some of the driving electrodes TE disposed at the other end may be connected to the second touch driving lines TLb, respectively.

The first touch driving lines TLa may be extended around one side of the touch sensing area TSA and connected to the driving electrodes TE on the one side of the touch sensing area TSA, respectively. The second touch driving lines TLb may be extended around the opposite side of the touch sensing area TSA and connected to the driving electrodes TE on the opposite side of the touch sensing area TSA. The first touch driving lines TLa and the second touch driving lines TLb may be electrically connected to the touch driver circuit 400 through the separate pad area.

The driving electrodes TE are connected to the first and second touch driving lines TLa and TLb on the two sides of the touch sensing area TSA to receive touch driving signals through the first and second touch driving lines TLa and TLb on the two sides. Accordingly, there may be deviations between the touch driving signals applied to the driving electrodes TE disposed relatively distant from the touch driver circuit 400 and the touch driving signals applied to the driving electrodes TE disposed relatively close to the touch driver circuit 400 due to RC delay of the touch driving signals.

Since the resistance increases in proportional to the lengths of the first and second touch driving lines TLa and TLb, the touch driving signals supplied to the driving electrodes TE disposed relatively close to the touch driver circuit 400 can be large and strong without distortion. However, touch driving signals supplied to the driving electrodes TE disposed relatively distant from the touch driving circuit 400 may be smaller and weaker as the distance increases.

Since smaller and weaker touch driving signals are supplied to the driving electrodes TE disposed relatively distant from the touch driver circuit 400, the sensing signals sensed through the sensing electrode RE disposed relatively distant from the touch driver circuit 400 are also smaller and weaker. Accordingly, touch sensitivity or touch sensing accuracy is lowered in the touch sensing area relatively farther away from the touch driver circuit 400.

The touch driver circuit 400 divides the touch sensing area TSA into divided areas having the same size or different sizes depending on the relative distances between the touch driver circuit 400 and the driving electrodes TE.

The touch driver circuit 400 may substantially simultaneously receive the touch driving signals to set the number of driving electrodes TE that are substantially simultaneously driven, based on the relative distances between the touch driver circuit 400 and the driving electrodes TE. Then, touch electrode groups may be formed, each including the respectively set number of driving electrodes TE. The arrangement areas in which the touch electrode groups are located may be distinguished into the respective divided areas. Accordingly, the size or area of each of the divided areas may be different depending on the number and arrangement area of the driving electrodes TE substantially simultaneously driven.

Alternatively, the touch driver circuit 400 may divide the touch sensing area TSA into divided areas having the same size or different sizes depending on the distances between the touch driver circuit 400 and the driving electrodes TE. In addition, the touch driver circuit 400 may set the driving electrodes TE included in each divided area as a substantially simultaneously driven touch electrode group. Accordingly, the number of driving electrodes TE for each touch electrode group that are substantially simultaneously driven may be determined according to the area or size of each divided area.

Figure 5:
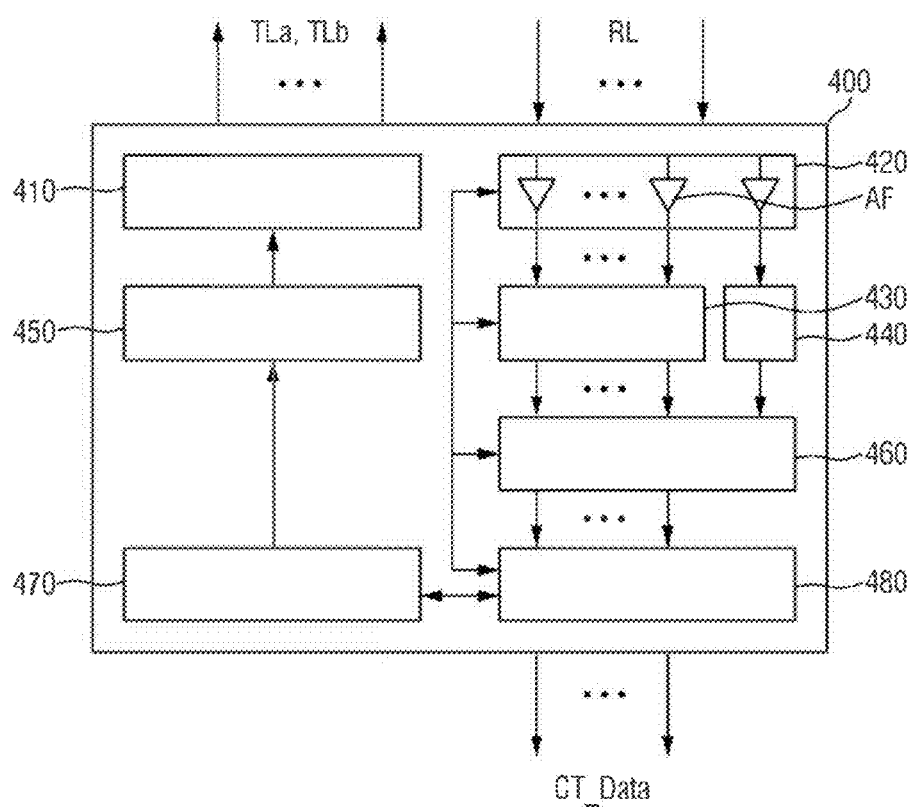
FIG. 5 is a block diagram showing in detail the touch driver circuit shown in FIGS. 1 and 2.

FIG. 5 shows in greater detail the touch driver circuit shown in FIGS. 1 and 2.

Referring to FIG. 5, the touch driver circuit 400 includes a driving signal output 410, a sensing circuit 420, an analog-to-digital converter 430, a current detector 440, a touch driving controller 450, a coordinate data generator 460, an electrode group setter 470, and a touch data output 480.

The driving signal output 410 supplies touch driving signals to the driving electrodes TE of each touch electrode group of the touch sensing unit TSU through the first and second touch driving lines TLa and TLb under the control of the touch driving controller 450. In doing so, the driving signal output 410 modulates at least one signal characteristic among the supply period, frequency band and voltage level of the touch driving signals in response to signal characteristic modulation signals input from the touch driving controller 450. Then, the touch driving signals after the signal characteristics have been modulated are sequentially supplied to the driving electrodes TE of each touch electrode group. The signal characteristics of the touch driving signals may be modulated equally or differently for different touch electrode groups in response to the signal characteristic modulation signals. The driving signal output 410 supplies touch driving signals through first and second touch driving lines TLa and TLb connected to the driving electrodes TE, respectively, and the touch driving signals are supplied to the driving electrodes TE of each touch electrode group substantially simultaneously.

The sensing circuit 420 senses the amount of a change in the capacitance of each of the touch nodes using sensing signals received from the touch sensing lines RL of the touch sensing unit TSU. For example, the sensing circuit 420 may receive touch driving signals fed back from the first or second touch driving lines TLa and TLb as sensing signals of the driving electrodes TE. Then, sensing signals sensed through the sensing electrodes RE are received from the touch sensing lines RL. The sensing circuit 420 may use operational amplifiers AF for sensing the amount of changes in the capacitances of the touch nodes using the sensing signals. The operational amplifiers AF may be connected to the touch sensing lines RL, respectively.

The analog-to-digital converter 430 samples the sensing signals amplified from the operational amplifiers AF of the sensing circuit 420. For example, the voltage level of the sensing signals, according to changes in the amount of charges at each of the touch nodes, may be sequentially converted into touch data, which may be represented as digital data.

The current detector 440 detects the amounts of current from test signals amplified by the operational amplifiers AF of the sensing circuit 420. The current detector 440 may detect each amount of current using a current detecting element, and may share the detected amount of current with the touch driving controller 450. The touch driving controller 450 may check a touch sensing operation and a touch sensing period of the touch sensing unit TSU in real time according to the amounts of detected current.

The coordinate data generator 460 compares changes in the size of the touch data sequentially input from the analog-to-digital converter 430 with the touch data input in the previous and subsequent periods and analyzes both to detect whether or not a touch has been made. Then, the coordinate data generator 460 matches the sequentially input touch data with a layout map of the touch nodes to generate touch position coordinate data CT_Data.

The touch data output 480 stores the touch position coordinate data CT_Data input from the coordinate data generator 460 at least once per frame, and supplies the touch position coordinate data CT_Data to the display driver circuit 200.

The electrode group setter 470 substantially simultaneously receives touch driving signals and sets the number of driving electrodes TE and the touch electrode groups to be substantially simultaneously driven based on the distances with the driving electrodes TE among the touch electrodes SE. The touch electrode group information on the driving electrodes TE substantially simultaneously driven may be shared with the touch driving controller 450 and the coordinate data generator 460.

The electrode group setter 470 checks the number of the driving electrodes TE arranged in parallel in the first direction (e.g., the x-axis direction) in the touch sensing area TSA from the driving electrodes TE relatively closest to the electrode group setter 470 to the driving electrodes TE farthest from the electrode group setter 470.

The electrode group setter 470 sets at least two driving electrodes TE that are disposed relatively closest to the electrode group setter 470 as first touch electrode groups so that the minimum number of groups can be formed. In addition, the electrode group setter 470 sets the second to $n^{th}$ touch electrode groups so that the number of driving electrodes TE substantially simultaneously driven is increased where further away from the electrode group setter 470, where n is a positive integer.

In greater detail, the electrode group setter 470 may form a first touch electrode group with at least two driving electrodes TE disposed relatively closest to each other, for example. Then, the electrode group setter 470 may set the second to $n^{th}$ touch electrode groups with 4, 6, 8, 10, 12, 16, 18, . . . , n driving electrodes, respectively, which are substantially simultaneously driven, as the distance from the electrode group setter 470 increases. The arrangement areas in which the first to $n^{th}$ touch electrode groups are located may be distinguished into the respective divided areas. Accordingly, the size or area of each of the divided areas divided into the first to $n^{th}$ touch electrode groups may be formed differently and distinguished depending on the number and arrangement area of the driving electrodes TE substantially simultaneously driven for each of the first to $n^{th}$ touch electrode groups.

The touch driving controller 450 modulates at least one of the signal characteristics among a supply period, a frequency band and/or a voltage level of the touch driving signals supplied to the touch driving electrodes TE of each of the first to $n^{th}$ touch electrode groups based on the first to $n^{th}$ touch electrode group information set by the electrode group setter 470.

For example, the touch driving controller 450 may set the supply periods of the touch driving signals supplied to the driving electrodes TE of each of the first to $n^{th}$ touch electrode groups by dividing their periods into first to $n^{th}$ periods, from the shortest period to the longest period, and may match first to $n^{th}$ period characteristic modulation signals with the first to $n^{th}$ touch electrode groups, respectively, to transmit these signals to the driving signal output 410. Accordingly, the driving signal output 410 may modulate the supply periods of the touch driving signals supplied to the driving electrodes TE of each of the first to $n^{th}$ touch electrode groups into different first to $n^{th}$ periods based on the first to $n^{th}$ period characteristic modulation signals matched for the first to $n^{th}$ touch electrode groups, respectively, and may supply the respective touch driving signals to the touch electrodes of each group.

The touch driving controller 450 may set the frequency bands of the touch driving signals supplied to the driving electrodes TE of each of the first to $n^{th}$ touch electrode groups by dividing the frequency bands into first to $n^{th}$ frequency bands, from the lowest frequency band to the highest frequency band, and may match first to $n^{th}$ frequency characteristic modulation signals with the first to $n^{th}$ touch electrode groups, respectively, to transmit the signals to the driving signal output 410. Accordingly, the driving signal output 410 may modulate the frequency bands of the touch driving signals supplied to the driving electrodes TE of each of the first to $n^{th}$ touch electrode groups into different first to $n^{th}$ frequency bands based on the first to $n^{th}$ frequency characteristic modulation signals matched for the first to $n^{th}$ touch electrode groups, respectively, and may supply the respective touch driving signals to the touch electrodes of each group.

The touch driving controller 450 may set the voltage level or amplitude of the touch driving signals supplied to the driving electrodes TE of each of the first to $n^{th}$ touch electrode groups by dividing the voltage levels into first to $n^{th}$ voltage levels, from the lowest voltage to the highest voltage, and may match first to $n^{th}$ voltage characteristic modulation signals with the first to $n^{th}$ touch electrode groups, respectively, to transmit the signals to the driving signal output 410. Accordingly, the driving signal output 410 may modulate the voltages of the touch driving signals supplied to the driving electrodes TE of each of the first to $n^{th}$ touch electrode groups into different first to $n^{th}$ voltage levels based on the first to $n^{th}$ voltage characteristic modulation signals matched for the first to $n^{th}$ touch electrode groups, respectively, and may supply the respective touch driving signals to the touch electrodes of each group.

Figure 6:
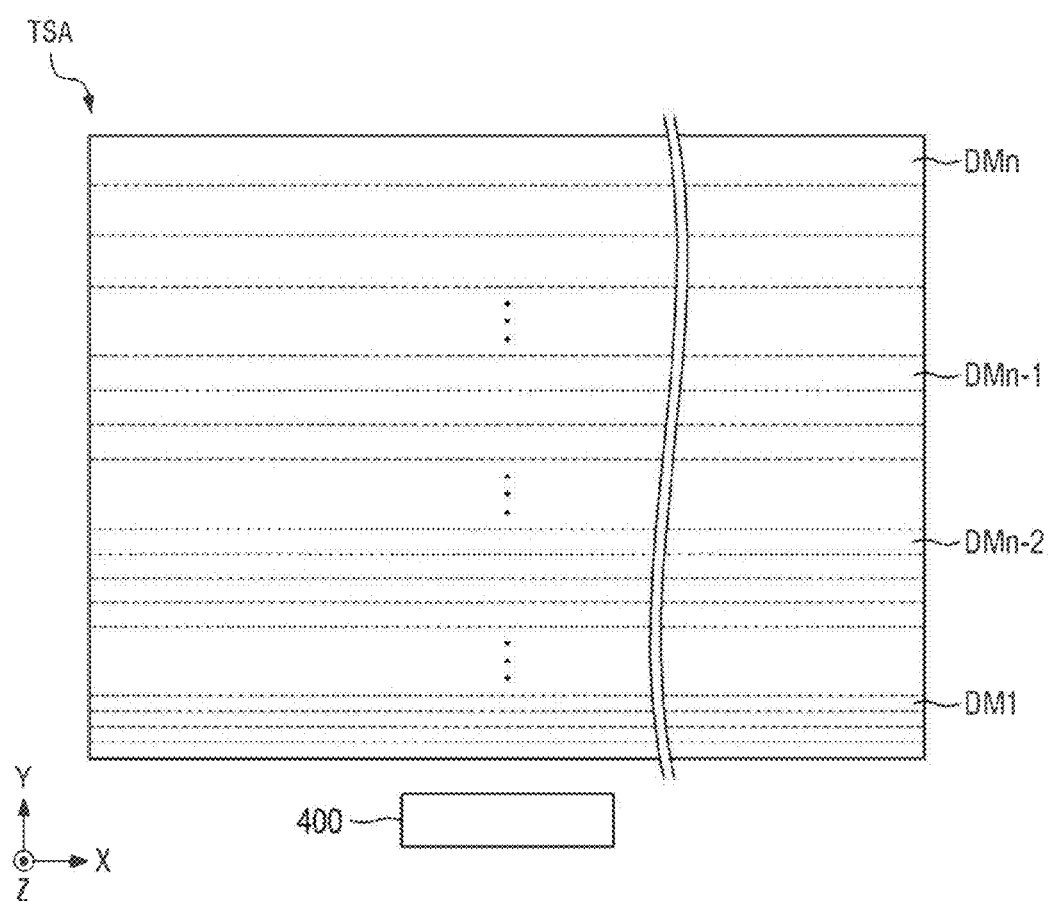
FIG. 6 is a block diagram for illustrating a method of dividing a touch sensing area, and a method of setting the number of touch driving electrodes for each divided area by a touch driver circuit according to a first embodiment.

FIG. 6 is provided for illustrating a method of dividing a touch sensing area, and a method of setting the number of touch driving electrodes for each divided area by a touch driver circuit according to a first embodiment.

Referring to FIG. 6, the electrode group setter 470 of the touch driver circuit 400, for the driving electrodes TE arranged in parallel in the first direction (e.g., the x-axis direction) in the touch sensing area TSA, may be set at least two or four driving electrodes TE disposed relatively closest to the touch driver circuit 400 as a first touch electrode group.

In addition, the electrode group setter 470 may set sixteen driving electrodes TE disposed farthest from the touch driver circuit 400 as the $n^{th}$ touch electrode group. In addition, the electrode group setter 470 may set the driving electrodes TE disposed relatively closer than the $n^{th}$ touch electrode groups as the $(n-1)^{th}$ touch electrode group including twelve driving electrodes TE. In addition, the electrode group setter 470 may set eight driving electrodes TE disposed relatively closer than the $(n-1)^{th}$ touch electrode groups as the $(n-2)^{th}$ touch electrode group.

In this manner, the electrode group setter 470 may set the first to nth touch electrode groups so that the number of driving electrodes TE substantially simultaneously driven decreases where the electrodes are relatively closer to the electrode group setter 470 while the number of driving electrodes TE substantially simultaneously driven increases where the electrodes are farther from the electrode group setter 470.

According to the results of setting the first to $n^{th}$ touch electrode groups by the electrode group setter 470, the arrangement areas of the first to $n^{th}$ touch electrode groups may be divided into first to $n^{th}$ divided areas DM1 to DMn, respectively. The arrangement areas of the driving electrode TE of the first touch electrode groups may be divided into first divided areas DM1. In addition, the arrangement areas of the driving electrodes TE of the $(n-2)^{th}$ touch electrode groups may be divided into $(n-2)^{th}$ divided areas DM(n-2), and the arrangement areas of the driving electrodes TE of the $(n-1)^{th}$ touch electrode groups may be divided into the $(n-1)^{th}$ divided areas DM(n-1). Accordingly, the arrangement areas of the driving electrodes TE of the $n^{th}$ touch electrode groups may be divided into $n^{th}$ divided areas DMn. Accordingly, the size or area of each of the divided areas of each of the first to $n^{th}$ touch electrode groups may be formed differently and distinguished depending on the number and arrangement area of the driving electrodes TE substantially simultaneously driven of each of the first to $n^{th}$ touch electrode groups.

Figure 7:
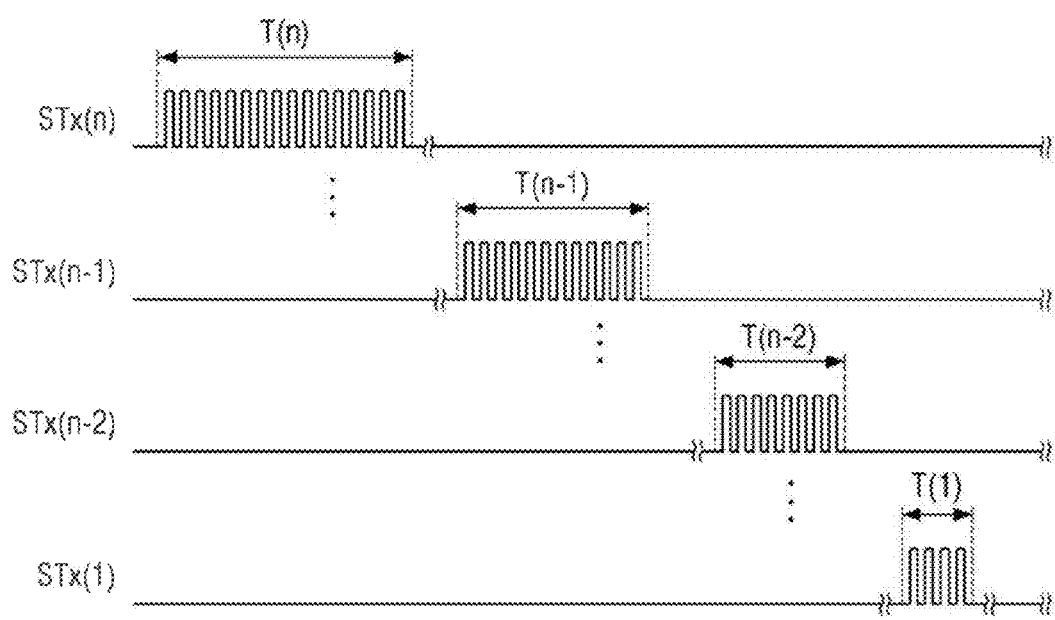
FIG. 7 is a timing diagram showing touch driving signals sequentially supplied to touch driving electrodes of each divided area during a touch sensing period according to the first embodiment.

FIG. 7 shows touch driving signals sequentially supplied to touch driving electrodes of each divided area during a touch sensing period according to the first embodiment.

The touch driving controller 450 may modulate supply period characteristics of the touch driving signals supplied to the touch driving electrodes TE of each of the first to $n^{th}$ touch electrode groups based on the first to $n^{th}$ touch electrode group information set by the electrode group setter 470.

For example, the touch driving controller 450 divides the supply periods of the touch driving signals supplied to the driving electrodes TE for each of the first to $n^{th}$ touch electrode groups into the first to $n^{th}$ periods T(1) to T(n) from the shortest period to the longest period within at least one frame. Subsequently, the touch driving controller 450 generates first to $n^{th}$ period characteristic modulation signals according to the first to $n^{th}$ periods T(1) to T(n), respectively, and matches the first to $n^{th}$ period characteristic modulation signals with the first to $n^{th}$ touch electrode groups to transmit the signals to the driving signal output 410.

The driving signal output 410 generates the $n^{th}$ touch driving signals for the $n^{th}$ period T(n) according to the $n^{th}$ period characteristic modulation signal, and supplies the $n^{th}$ touch driving signals to connection channels STx(n) of the driving electrodes TE of each of the $n^{th}$ touch electrode groups. Subsequently, the driving signal output 410 generates the $(n-1)^{th}$ touch driving signals for the $(n-1)^{th}$ period T(n-1) according to the $(n-1)^{th}$ period characteristic modulation signal, and supplies the $(n-1)^{th}$ touch driving signals to connection channels STx(n-1) of the driving electrodes TE of each of the $(n-1)^{th}$ touch electrode groups. In this order, the driving signal output 410 supplies the first touch driving signals of the first period T(1) through the connection channels STx(1) up to the driving electrodes TE of the first touch electrode groups.

As described above, the $n^{th}$ touch driving signals are supplied to the driving electrodes TE of each of the $n^{th}$ touch electrode groups having the largest RC deviations and distortions of the touch driving signal for the longest $n^{th}$ period T(n). Then, the periods in which the touch driving signals are supplied become shorter and shorter up to the driving electrodes of each of the first touch electrode groups having the smallest RC deviations and distortions of the touch driving signal. In this manner, it is possible to reduce RC deviations and distortions of touch driving signals supplied to substantially all of the driving electrodes TE disposed in the touch sensing area TSA.

Figure 8:
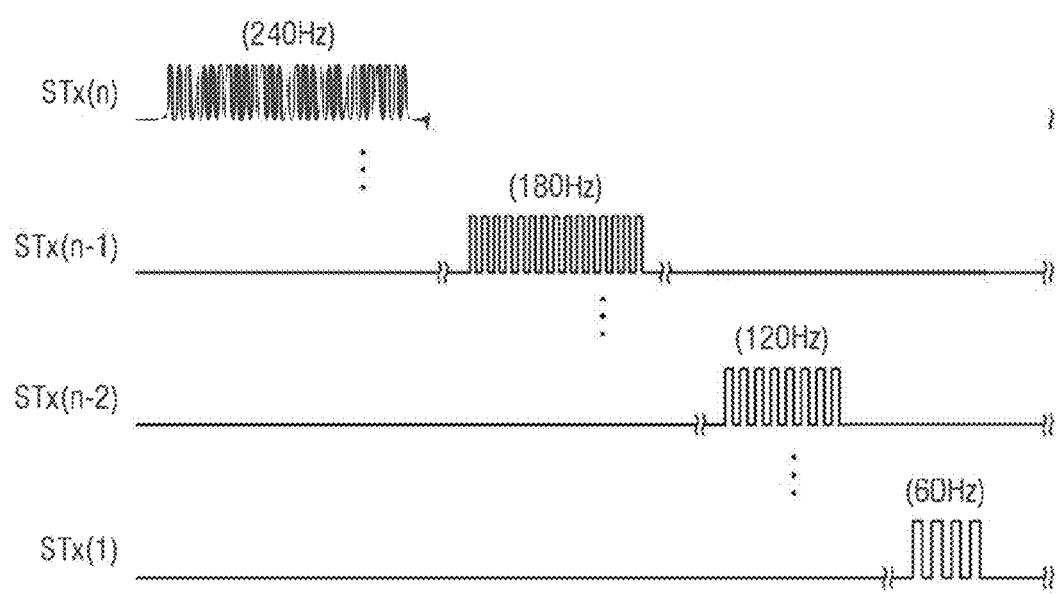
FIG. 8 is a timing diagram showing touch driving signals sequentially supplied to touch driving electrodes of each divided area during a touch sensing period according to a second embodiment.

FIG. 8 shows touch driving signals sequentially supplied to touch driving electrodes of each divided area during a touch sensing period according to a second embodiment.

The touch driving controller 450 may modulate frequency characteristics of the touch driving signals supplied to the touch driving electrodes TE of each of the first to $n^{th}$ touch electrode groups based on the first to $n^{th}$ touch electrode group information set by the electrode group setter 470.

For example, the touch driving controller 450 divides the frequency bands of the touch driving signals supplied to the driving electrodes TE of each of the first to $n^{th}$ touch electrode groups into the first to $n^{th}$ frequency bands from predetermined lowest frequency band to highest frequency band. Subsequently, the touch driving controller 450 generates first to $n^{th}$ frequency characteristic modulation signals according to the divided first to $n^{th}$ frequency bands, and matches the first to $n^{th}$ frequency characteristic modulation signals with the first to $n^{th}$ touch electrode groups to transmit the signals to the driving signal output 410.

The driving signal output 410 generates the $n^{th}$ touch driving signals of the $n^{th}$ frequency band (e.g., 240 Hz) according to the $n^{th}$ frequency characteristic modulation signal, and supplies the $n^{th}$ touch driving signals of the $n^{th}$ frequency band (e.g., 240 Hz) to the connection channels STx(n) of the driving electrodes TE of each of the $n^{th}$ touch electrode groups. Subsequently, the driving signal output 410 generates the $(n-1)^{th}$ touch driving signals of the $(n-1)^{th}$ frequency band (e.g., 180 Hz) according to the $(n-1)^{th}$ frequency characteristic modulation signal, and supplies the $(n-1)^{th}$ touch driving signals of the $(n-1)^{th}$ frequency band (e.g., 180 Hz) to the connection channels STx(n-1) of the driving electrodes TE of each of the $(n-1)^{th}$ touch electrode groups. In this order, the driving signal output 410 supplies the first touch driving signals of the first frequency band (e.g., 60 Hz) through the connection channel STx(1) to the driving electrodes TE of the first touch electrode groups.

As described above, the $n^{th}$ touch driving signals of the highest frequency band (e.g., 240 Hz) are supplied to the driving electrodes TE of the $n^{th}$ touch electrode group having the largest RC deviations and distortions of the touch driving signals. In addition, the touch driving signals of lower and lower frequency bands may be supplied up to the driving electrodes TE of each of the first touch electrode groups having the smallest driving deviations and distortions of the touch driving signals. In this manner, it is possible to reduce RC deviations and distortions of touch driving signals supplied to substantially all of the driving electrodes TE disposed in the touch sensing area TSA.

Figure 9:
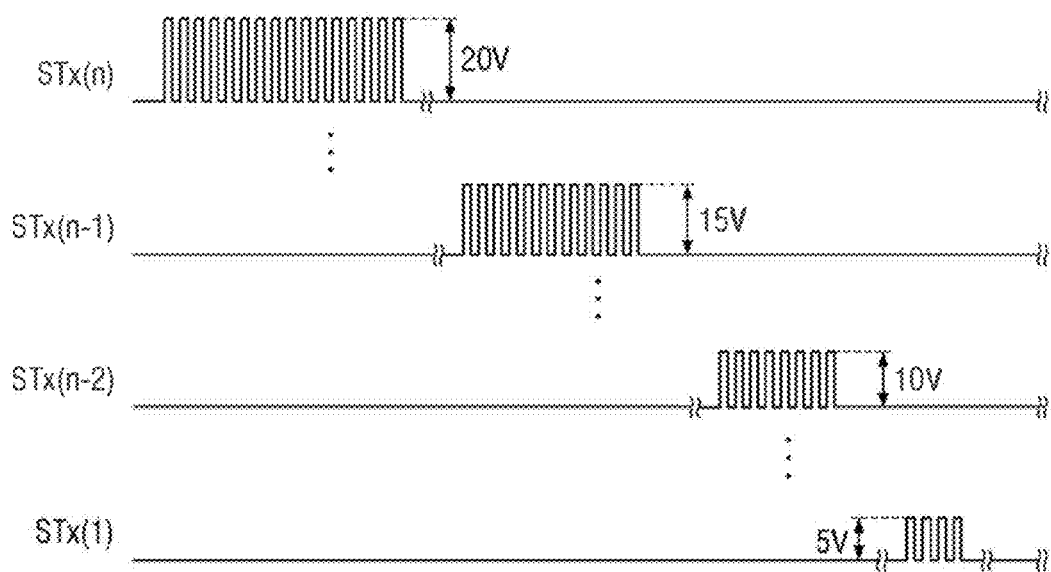
FIG. 9 is a timing diagram showing touch driving signals sequentially supplied to touch driving electrodes of each divided area during a touch sensing period according to a third embodiment.

FIG. 9 shows touch driving signals sequentially supplied to touch driving electrodes of each divided area during a touch sensing period according to a third embodiment.

The touch driving controller 450 may modulate voltage level characteristics or amplitude of the touch driving signals supplied to the touch driving electrodes TE of each of the first to $n^{th}$ touch electrode groups based on the first to $n^{th}$ touch electrode group information set by the electrode group setter 470.

For example, the touch driving controller 450 divides the voltage levels of the touch driving signals supplied to the driving electrodes TE of each of the first to $n^{th}$ touch electrode groups into the first to $n^{th}$ voltage levels from the lowest voltage to the highest voltage. Subsequently, the touch driving controller 450 generates first to $n^{th}$ voltage characteristic modulation signals according to the divided first to $n^{th}$ voltage levels, and matches the first to $n^{th}$ voltage characteristic modulation signals with the first to $n^{th}$ touch electrode groups to transmit the signals to the driving signal output 410.

The driving signal output 410 generates the $n^{th}$ touch driving signals of the $n^{th}$ voltage level (e.g., 20 V) according to the $n^{th}$ voltage characteristic modulation signal, and supplies the $n^{th}$ touch driving signals of the $n^{th}$ voltage level to the connection channel STx(n) of the driving electrodes TE of the $n^{th}$ touch electrode group. Subsequently, the driving signal output 410 generates the $(n-1)^{th}$ touch driving signals of the $(n-1)^{th}$ voltage level (e.g., 15 V) according to the $(n-1)^{th}$ voltage characteristic modulation signal, and supplies the $(n-1)^{th}$ touch driving signals of the $(n-1)^{th}$ voltage level (e.g., 15 V) to the connection channel STx(n) of the driving electrodes TE of the $(n-1)^{th}$ touch electrode group. In such an order, the driving signal output 410 supplies the first touch driving signals of the first voltage level (e.g., 5V) through the connection channels STx(1) up to the driving electrodes TE of the first touch electrode groups.

As described above, the $n^{th}$ touch driving signals of the highest $n^{th}$ voltage level are supplied to the driving electrodes TE of the $n^{th}$ touch electrode group having the largest RC deviations and distortions of the touch driving signals. In addition, the touch driving signals of lower and lower voltages may be supplied up to the driving electrodes TE of each of the first touch electrode groups having the smallest driving deviations and distortions of the touch driving signals. In this manner, it is possible to reduce RC deviations and distortions of touch driving signals supplied to substantially all of the driving electrodes TE disposed in the touch sensing area TSA.

Figure 10:
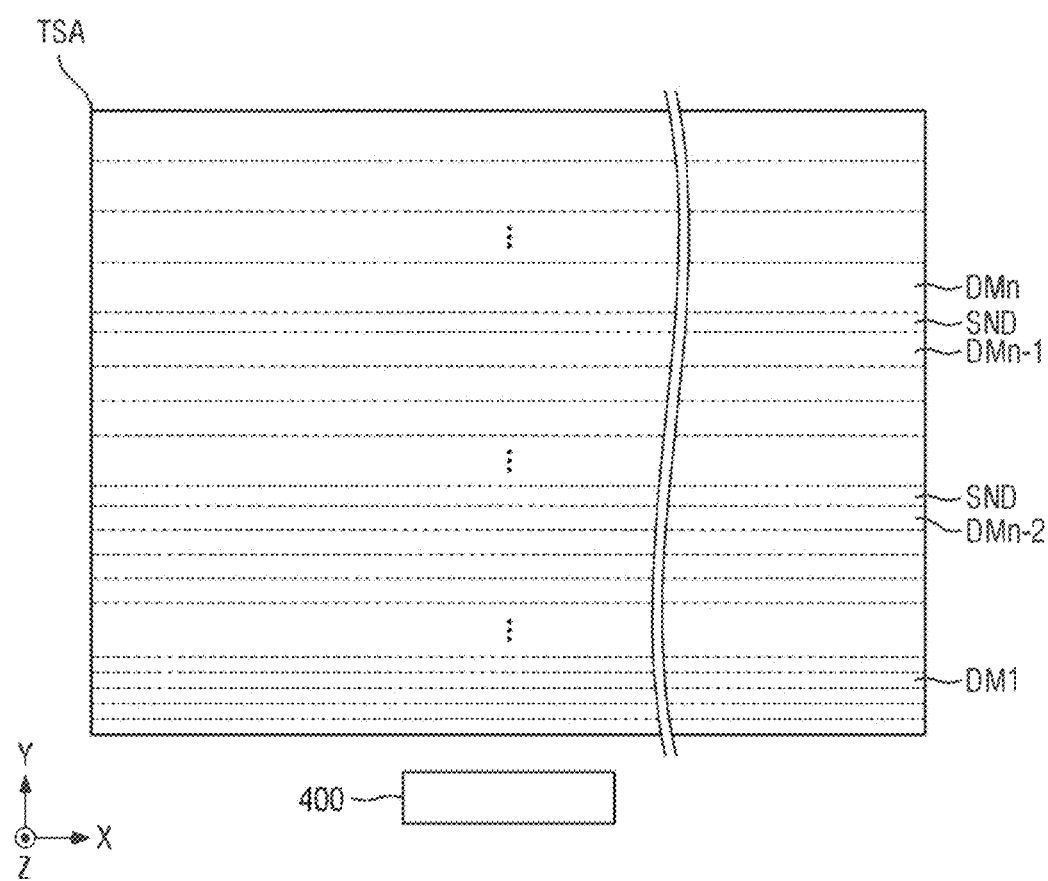
FIG. 10 is a block diagram for illustrating a method of dividing a touch sensing area, and a method of setting the number of touch driving electrodes for each divided area by a touch driver circuit according to a second embodiment.

FIG. 10 is provided for illustrating a method of dividing a touch sensing area, and a method of setting the number of touch driving electrodes for each divided area by a touch driver circuit according to a second embodiment.

Referring to FIG. 10, the electrode group setter 470 may set sixteen driving electrodes TE disposed farthest from the touch driver circuit 400 as the $n^{th}$ touch electrode group. In addition, the electrode group setter 470 may set the driving electrodes TE disposed relatively closer than the $n^{th}$ touch electrode groups as the $(n-1)^{th}$ touch electrode group including twelve driving electrodes TE. In addition, the electrode group setter 470 may set eight driving electrodes TE disposed relatively closer than the $(n-1)^{th}$ touch electrode groups as the $(n-2)^{th}$ touch electrode groups.

In this manner, the electrode group setter 470 of the touch driver circuit 400 may set the first to $n^{th}$ touch electrode groups so that the number of driving electrodes TE substantially simultaneously driven decreases as the electrode groups are relatively closer to the electrode group setter 470 while the number of driving electrodes TE substantially simultaneously driven increases as the electrode groups are farther from the electrode group setter 470.

In addition, the electrode group setter 470 may set an overlap area SND in which the driving periods of the driving electrodes TE overlap each other at or about at least one of the boundaries of the first to $n^{th}$ touch electrode groups. The driving electrodes TE disposed in the overlap area SND may be driven by receiving touch driving signals together with the driving electrodes TE of the previous touch electrode groups, and then may be continuously driven together with the driving electrodes TE of the current group by receiving the touch driving signals. The overlap areas SND may be set in advance such that these areas are in line with folding areas of the display panel 100, so that it is possible to prevent deterioration of touch driving signals or sensing signals in the folding areas.

Figure 11:
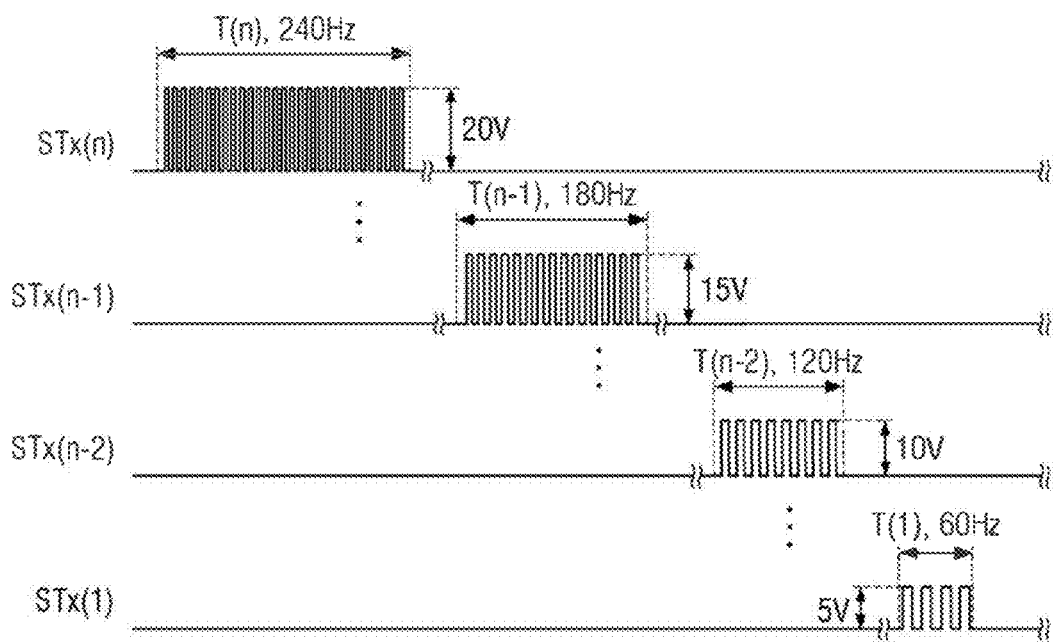
FIG. 11 is a timing diagram showing touch driving signals sequentially supplied to touch driving electrodes of each divided area during a touch sensing period according to a fourth embodiment.

FIG. 11 shows touch driving signals sequentially supplied to touch driving electrodes of each divided area during a touch sensing period according to a fourth embodiment.

The touch driving controller 450 modulates more than one of the signal characteristics among a supply period, a frequency band and a voltage level of the touch driving signals STx supplied to the touch driving electrodes TE of each of the first to $n^{th}$ touch electrode groups based on the first to $n^{th}$ touch electrode group information set by the electrode group setter 470.

For example, the touch driving controller 450 divides the frequency bands of the touch driving signals supplied to the driving electrodes TE of each of the first to $n^{th}$ touch electrode groups into the first to $n^{th}$ frequency bands from predetermined lowest frequency band to highest frequency band. For example, the touch driving controller 450 divides the voltage levels of the touch driving signals supplied to the driving electrodes TE of each of the first to $n^{th}$ touch electrode groups into the first to $n^{th}$ voltage levels from predetermined lowest voltage to highest voltage.

Subsequently, the touch driving controller 450 generates first to nth complex characteristic modulation signals according to the divided first to nth frequency bands and first to $n^{th}$ voltage levels, and matches the first to $n^{th}$ complex characteristics modulation signals with the first to $n^{th}$ touch electrode groups to transmit the signals to the driving signal output 410.

The driving signal output 410 generates the $n^{th}$ touch driving signals of the $n^{th}$ voltage level (e.g., 20 V) according to the $n^{th}$ complex characteristic modulation signal, and supplies the $n^{th}$ touch driving signals to the connection channels STx(n) of the driving electrodes TE of each of the $n^{th}$ touch electrode groups. Subsequently, the driving signal output 410 generates the $(n-1)^{th}$ touch driving signals of the $(n-1)^{th}$ voltage level (e.g., 15 V) with $(n-1)^{th}$ frequency band (e.g., 180 Hz) according to the $(n-1)^{th}$ complex characteristic modulation signal, and supplies the $(n-1)^{th}$ touch driving signals to the connection channels STx(n) of the driving electrodes TE of each of the $(n-1)^{th}$ touch electrode groups. In this order, the driving signal output 410 supplies the first touch driving signals with the first voltage level (e.g., 5 V) of the first frequency band (e.g., 60 Hz) through the connection channels STx(1) up to the driving electrodes TE of the first touch electrode groups.

As described above, the $n^{th}$ touch driving signals of the highest voltage level and the frequency band are supplied to the driving electrodes TE of the $n^{th}$ touch electrode group having the largest RC deviations and distortions of the touch driving signals. In addition, the touch driving signals of lower and lower voltages and frequency bands may be supplied up to the driving electrodes TE of each of the first touch electrode groups having the smallest driving deviations and distortions of the touch driving signals. In this manner, it is possible to reduce RC deviations and distortions of touch driving signals supplied to the driving electrodes TE disposed in the touch sensing area TSA.

Figure 12:
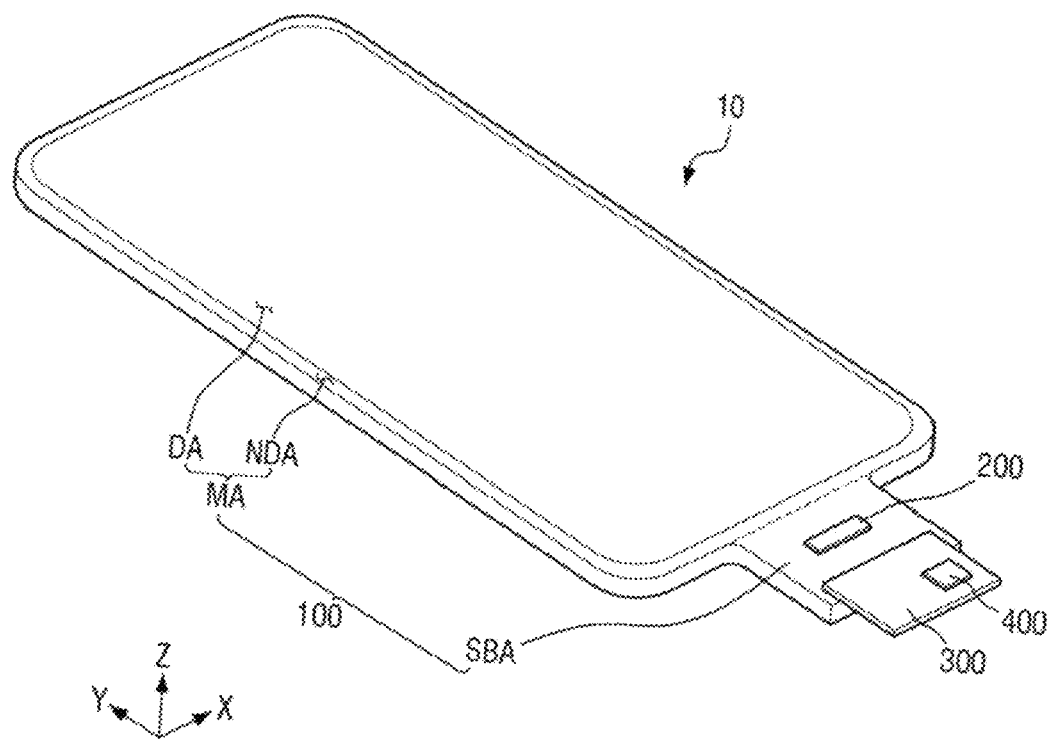
FIG. 12 is a perspective view diagram showing a display device according to another embodiment of the present disclosure.

FIG. 12 shows a display device according to another embodiment of the present disclosure.

Referring to FIG. 12, a display device 10 according to an embodiment may be applied to a mobile phone, a smart phone, a tablet PC, or the like. as the display device. Referring to FIGS. 1 and 2, the display device 10 used in a mobile phone, a smart phone, a tablet PC, or the like. includes a display panel 100, a display driver circuit 200, and a touch detection module including a touch sensing unit TSU and a touch driving circuit 400. The touch driving circuit 400 may apply the scheme of sequentially driving the driving electrodes TE group by group at least once per frame, to increase the accuracy of touch detection. In addition, by applying the scheme of sequentially driving the driving electrodes TE group by group, the touch driver circuit 400 may set the number of driving electrodes TE of each group that are substantially simultaneously driven (e.g., the number of channels of the driving electrodes) so that the distortions of the touch driving signals are reduced, to further increase the accuracy of touch detection.

Figure 13:
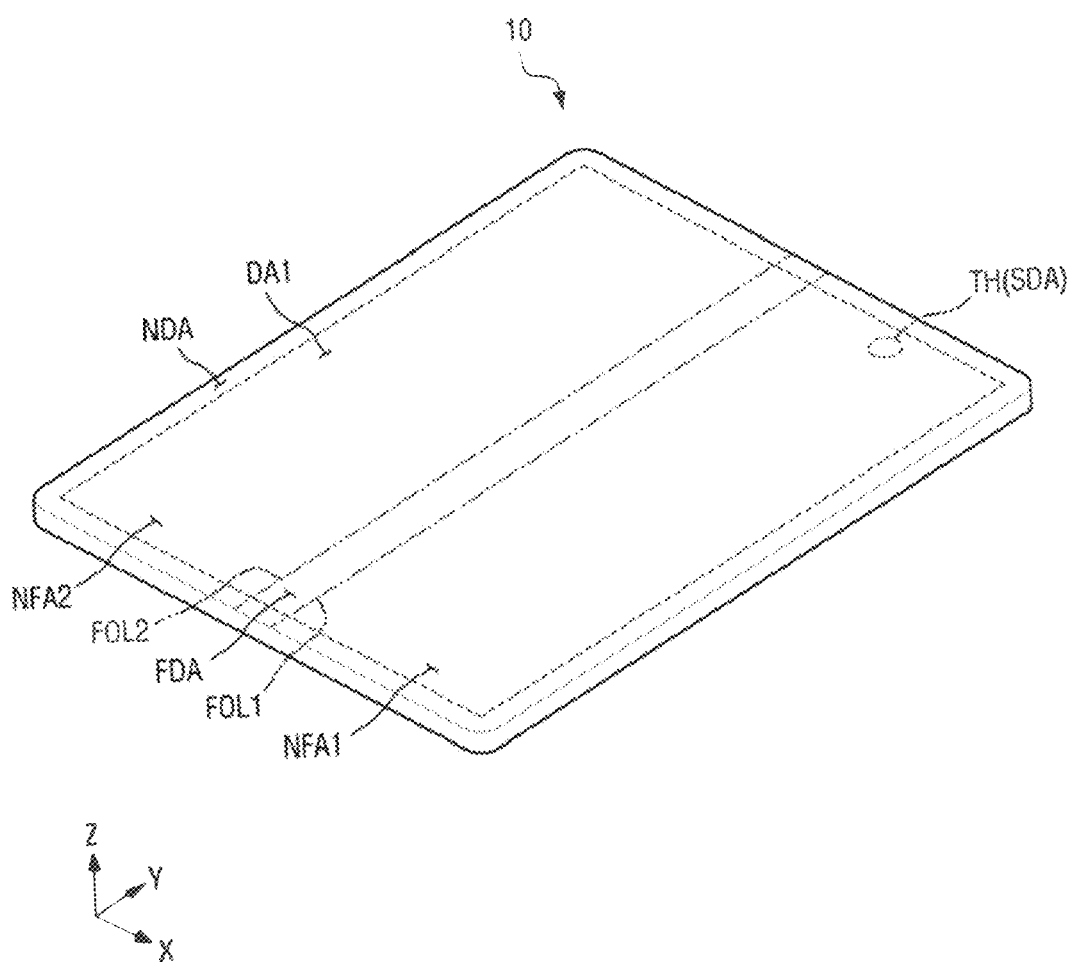
FIGS. 13 and 14 are perspective view diagrams showing a display device according to yet another embodiment.
Figure 14:
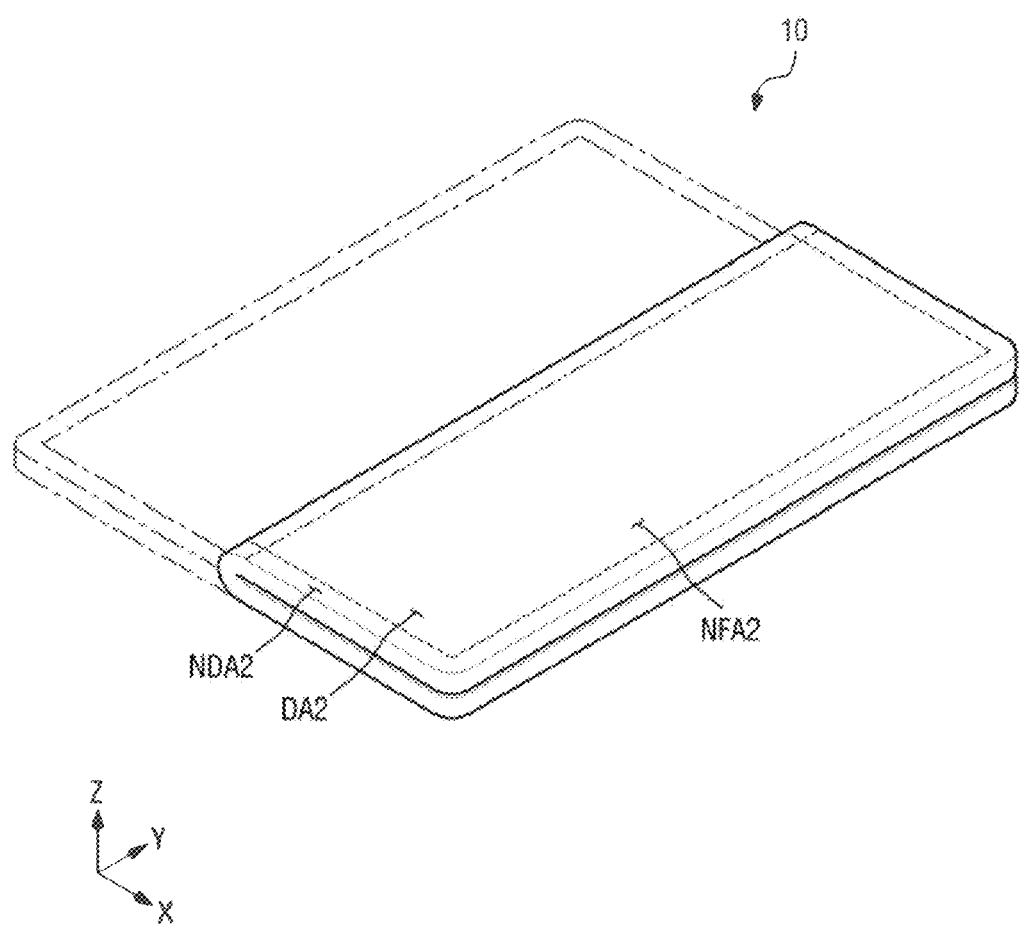

FIGS. 13 and 14 are perspective views showing a display device according to yet another embodiment.

In the embodiment shown in FIGS. 13 and 14, a display device 10 is a foldable display device that can be folded in the first direction (e.g., the x-axis direction). The display device 10 may remain folded as well as unfolded. The display device 10 may be folded inward (e.g., in-folding manner) such that the front surface is located inside. When the display device 10 is bent or folded in the in-folding manner, a part of the front surface of the display device 10 may face the other part of the front surface. Alternatively, the display device 10 may be folded outward (e.g., out-folding manner) such that the front surface is located outside. When the display device 10 is bent or folded in the out-folding manner, a part of the rear surface of the display device 10 may face the other part of the rear surface.

The first non-folding area NFA1 may be disposed on one side, for example, the right side of the folding area FDA. The second non-folding area NFA2 may be disposed on the opposite side, for example, the left side of the folding area FDA. The touch sensing unit TSU according to this embodiment of the present disclosure may be formed and disposed on each of the first non-folding area NFA1 and the second non-folding area NFA2.

The first folding line FOL1 and the second folding line FOL2 may be extended in the second direction (e.g., the y-axis direction), and the display device 10 may be folded in the first direction (e.g., the x-axis direction). As a result, the length of the display device 10 in the first direction (e.g., the x-axis direction) may be reduced to about half, so that a user can conveniently carry the display device 10.

The direction in which the first folding line FOL1 and the second folding line FOL2 are extended is not limited to the second direction (e.g., the y-axis direction). For example, the first folding line FOL1 and the second folding line FOL2 may be extended in the first direction (e.g., the x-axis direction), and the display device 10 may be folded in the second direction (e.g., the y-axis direction). In such an embodiment, the length of the display device 10 in the second direction (e.g., the y-axis direction) may be reduced to about half. Alternatively, the first folding line FOL1 and the second folding line FOL2 may be extended in a diagonal direction of the display device 10 between the first direction (e.g., the x-axis direction) and the second direction (e.g., the y-axis direction). In such an embodiment, the display device 10 may be folded in a triangle shape.

When the first folding line FOL1 and the second folding line FOL2 are extended in the second direction (e.g., the y-axis direction), the length of the folding area FDA in the first direction (e.g., the x-axis direction) may be smaller than the length in the second direction (e.g., the y-axis direction). In addition, the length of the first non-folding area NFA1 in the first direction (e.g., the x-axis direction) may be larger than the length of the folding area FDA in the first direction (e.g., the x-axis direction). The length of the second non-folding area NFA2 in the first direction (e.g., the x-axis direction) may be larger than the length of the folding area FDA in the first direction (e.g., the x-axis direction).

The first display area DA1 may be disposed on the front side of the display device 10. The first display area DA1 may overlap the folding area FDA, the first non-folding area NFA1, and the second non-folding area NFA2. Therefore, when the display device 10 is unfolded, images may be displayed on the front side of the folding area FDA, the first non-folding area NFA1 and the second non-folding area NFA2 of the display device 10.

The second display area DA2 may be disposed on the rear side of the display device 10. The second display area DA2 may overlap the second non-folding area NFA2. Therefore, when the display device 10 is folded, images may be displayed on the front side of the second non-folding area NFA2 of the display device 10.

Although the through hole TH where a camera SDA or the like is formed is located in the first non-folding area NFA1 in FIGS. 13 and 14, the present disclosure is not limited thereto. The through hole TH or the camera SDA may be located in the second non-folding area NFA2 or the folding area FDA.

Figure 15:
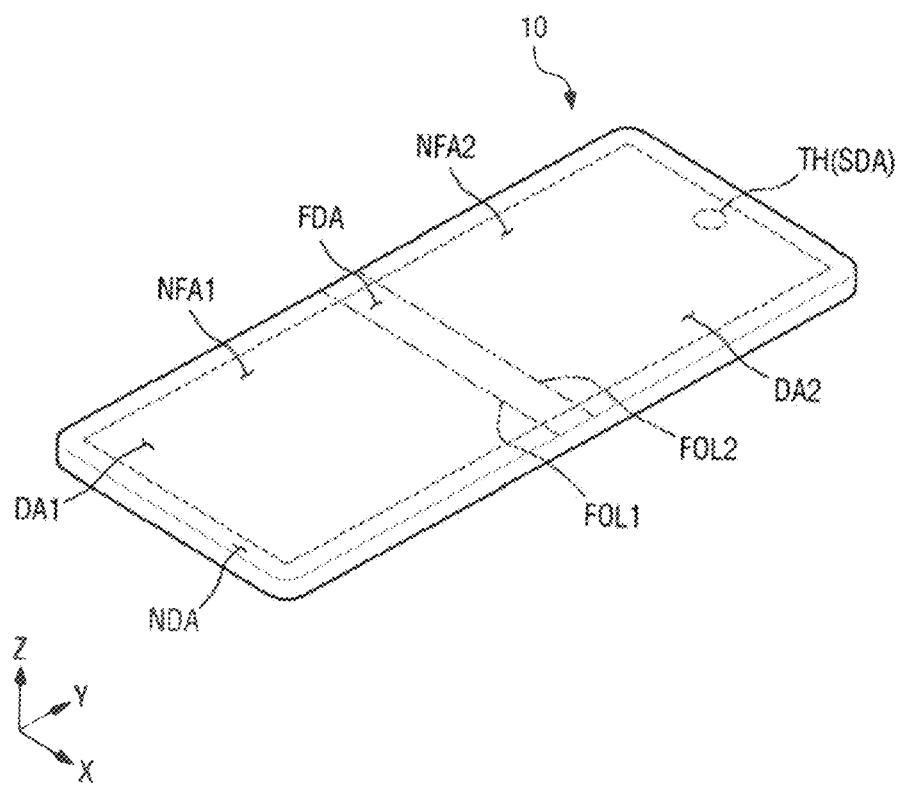
FIGS. 15 and 16 are perspective view diagrams showing a display device according to still another embodiment of the present disclosure.
Figure 16:
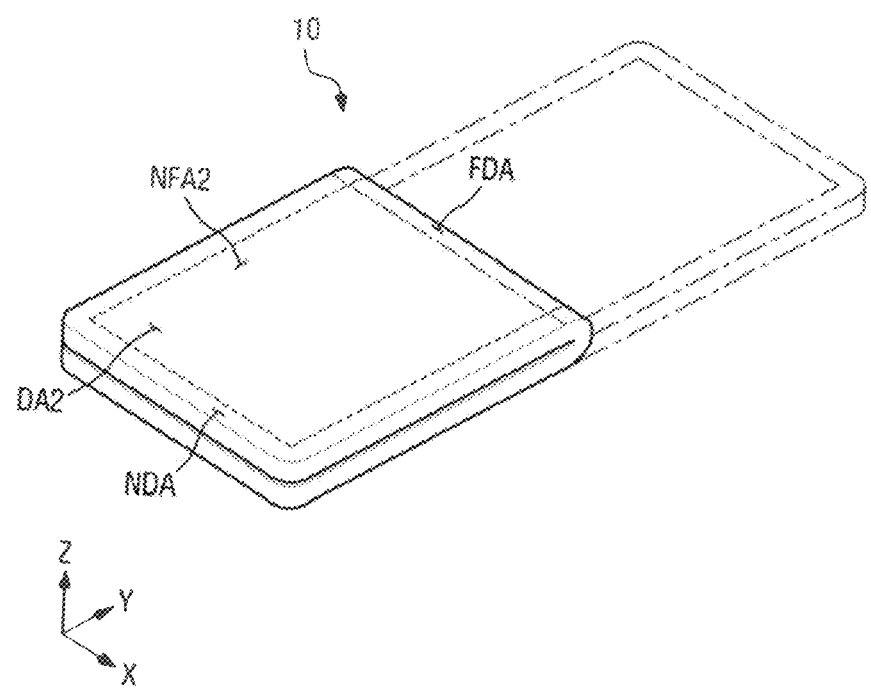

FIGS. 15 and 16 are perspective views showing a display device according to still another embodiment of the present disclosure.

In the embodiment shown in FIGS. 15 and 16, a display device 10 is a foldable display device that is folded in the second direction (e.g., the y-axis direction). The display device 10 may remain folded as well as unfolded. The display device 10 may be folded inward (e.g., in an in-folding manner) such that the front surface is located inside. When the display device 10 is bent or folded in the in-folding manner, a part of the front surface of the display device 10 may face the other part of the front surface. Alternatively, the display device 10 may be folded outward (e.g., in an out-folding manner) such that the front surface is located outside. When the display device 10 is bent or folded in the out-folding manner, a part of the rear surface of the display device 10 may face the other part of the rear surface.

The display device 10 may include a folding area FDA, a first non-folding area NFA1, and a second non-folding area NFA2. The display device 10 can be folded at the folding area FDA, while it cannot be folded at the first non-folding area NFA1 and the second non-folding area NFA2. The first non-folding area NFA1 may be disposed on one side, for example, the lower side of the folding area FDA. The second non-folding area NFA2 may be disposed on the other side, for example, the upper side of the folding area FDA.

The touch sensing unit TSU according to this embodiment of the present disclosure may be formed and disposed on each of the first non-folding area NFA1 and the second non-folding area NFA2.

The folding area FDA may be an area bent with a predetermined curvature over the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may be extended in the first direction (e.g., the x-axis direction) as shown in FIGS. 15 and 16, and the display device 10 may be folded in the second direction (e.g., the y-axis direction). As a result, the length of the display device 10 in the second direction (e.g., the y-axis direction) may be reduced to about half, so that the display device 10 is convenient to carry.

The direction in which the first folding line FOL1 and the second folding line FOL2 are extended is not limited to the first direction (e.g., the x-axis direction). For example, the first folding line FOL1 and the second folding line FOL2 may be extended in the second direction (e.g., the y-axis direction), and the display device 10 may be folded in the first direction (e.g., the x-axis direction). In such an embodiment, the length of the display device 10 in the first direction (e.g., the x-axis direction) may be reduced to about half. Alternatively, the first folding line FOL1 and the second folding line FOL2 may be extended in a diagonal direction of the display device 10 between the first direction (e.g., the x-axis direction) and the second direction (e.g., the y-axis direction). In such an embodiment, the display device 10 may be folded in a triangle shape.

When the first folding line FOL1 and the second folding line FOL2 are extended in the first direction (e.g., the x-axis direction) as shown in FIGS. 15 and 16, the length of the folding area FDA in the second direction (e.g., the y-axis direction) may be smaller than the length in the first direction (e.g., the x-axis direction). In addition, the length of the first non-folding area NFA1 in the second direction (e.g., the y-axis direction) may be larger than the length of the folding area FDA in the second direction (e.g., the y-axis direction). The length of the second non-folding area NFA2 in the second direction (e.g., the y-axis direction) may be larger than the length of the folding area FDA in the second direction (e.g., the y-axis direction).

The first display area DA1 may be disposed on the front side of the display device 10. The first display area DA1 may overlap the folding area FDA, the first non-folding area NFA1, and the second non-folding area NFA2, without limitation thereto. Therefore, when the display device 10 is unfolded, images may be displayed on the front side of the folding area FDA, the first non-folding area NFA1 and the second non-folding area NFA2 of the display device 10.

The second display area DA2 may be disposed on the rear side of the display device 10. The second display area DA2 may overlap the second non-folding area NFA2, without limitation thereto. Therefore, when the display device 10 is folded, images may be displayed on the front side of the second non-folding area NFA2 of the display device 10.

Although the through hole TH where the camera SDA or the like is disposed is located in the second non-folding area NFA2 in FIGS. 15 and 16, the present disclosure is not limited thereto. The through hole TH may be located in the first non-folding area NFA1 or the folding area FDA.

In concluding the detailed description, those of ordinary skill in the pertinent art will appreciate that many variations and modifications can be made to the described embodiments, which have been presented by way of non-limiting example, without substantially departing from the principles of the present disclosure. Therefore, the described embodiments of the present disclosure are provided in a generic and descriptive sense, and not for purposes of limitation.

What is claimed is:

1. A touch detection module comprising:
    driving electrodes arranged in parallel,
    sensing electrodes arranged to cross the driving electrodes; and
    a touch driver circuit configured to supply touch driving signals to the driving electrodes and detect touch sensing signals through the sensing electrodes to determine touch position coordinates,
    wherein the touch driver circuit:
    sorts the driving electrodes into a plurality of touch electrode groups based on distances between the touch driver circuit and the driving electrodes, and
    sequentially supplies the touch driving signals to the driving electrodes of the touch electrode groups,
    comprises a touch driving controller configured to generate signal characteristic modulation signal such that at least one signal characteristic among supply period, frequency band and voltage level of the touch driving signals is modulated to control driving of a driving signal output, and an electrode group setter configured to set the number of the driving electrodes simultaneously driven by the touch driving signals and the touch electrode groups, and to share touch electrode group information with a coordinate data generator.

2. The touch detection module of claim 1,
    wherein the touch driver circuit sets a number of driving electrodes that are simultaneously driven by receiving the touch driving signals, and forms touch electrode groups comprising the set number of the driving electrode, and
    wherein areas in which the touch electrode groups are located are distinguished into divided areas.

3. The touch detection module of claim 1,
    wherein the driving signal output is configured to modulate the at least one signal characteristic among supply period, frequency band and voltage level of the touch drive signals to supply the touch driving signals to driving electrodes of each of the touch electrode groups,
    wherein the touch driver circuit further comprises:
    a sensing circuit configured to detect the touch sensing signals through the sensing electrodes.

4. The touch detection module of claim 1, wherein the touch driver circuit sets the first to nth touch electrode groups so that the number of driving electrodes simultaneously driven decreases as the driving electrodes are relatively closer to the touch driver circuit, and the number of driving electrodes simultaneously driven increases as the driving electrodes are farther from the touch driver circuit.

5. The touch detection module of claim 4, wherein the touch driver circuit modulates at least one signal characteristic among supply period, frequency band or voltage level of the touch driving signals supplied to the driving electrodes of each of the first to nth touch electrode groups, to supply the respective touch driving signals to the driving electrodes of each of the first to nth touch electrode groups.

6. The touch detection module of claim 4, wherein the touch driver circuit divides supply periods of the touch driving signals supplied to the driving electrodes of each of the first to nth touch electrode groups into first to nth periods from a shortest period to a longest period within at least one frame, generates first to nth period characteristic modulation signals for the different first to nth periods, respectively, and supplies the first to nth touch driving signals in the different first to nth periods, respectively, to the driving electrodes of each of the first to nth touch electrode groups.

7. The touch detection module of claim 4, wherein the touch driver circuit divides frequency bands of the touch driving signals supplied to the driving electrodes of each of the first to nth touch electrode groups into first to nth frequency bands from predetermined lowest frequency band to highest frequency band, generates first to nth frequency characteristic modulation signals for the different first to nth frequency bands, respectively, and supplies the first to nth touch driving signals of the different first to nth frequency bands, respectively, to the driving electrodes of each of the first to nth touch electrode groups.

8. The touch detection module of claim 4, wherein the touch driver circuit divides voltage levels of the touch driving signals supplied to the driving electrodes of each of the first to nth touch electrode groups into first to nth voltage levels from predetermined lowest voltage to highest voltage, generates first to nth voltage characteristic modulation signals for the different first to nth voltage levels, respectively, and supplies the first to nth touch driving signals of the different first to nth voltage levels, respectively, to the driving electrodes of each of the first to nth touch electrode groups.

9. The touch detection module of claim 4, wherein the touch driver circuit divides voltage levels of the touch driving signals supplied to the driving electrodes of each of the first to nth touch electrode groups into first to nth voltage levels from predetermined lowest voltage to highest voltage, divides frequency bands of the touch driving signals supplied to the driving electrodes of each of the first to nth touch electrode groups into first to nth frequency bands from predetermined lowest frequency band to highest frequency band, generates first to nth complex characteristic modulation signals for the different first to nth frequency bands and the different first to nth voltage levels, respectively, and supplies the first to nth touch driving signals of the different first to nth voltage levels and the different first to nth frequency bands, respectively, to the driving electrodes of each of the first to nth touch electrode groups.

10. A touch detection module comprising:
driving electrodes arranged in parallel;
sensing electrodes arranged to cross the driving electrodes; and
a touch driver circuit configured to supply touch driving signals to the driving electrodes and detect touch sensing signals through the sensing electrodes to determine touch position coordinates,
wherein the touch driver circuit:
sorts the driving electrodes into a plurality of touch electrode groups based on distances between the touch driver circuit and the driving electrodes, and sequentially supplies the touch driving signals to the driving electrodes of the touch electrode groups,
comprises a touch driving controller configured to generate signal characteristic modulation signals such that at least one signal characteristic among supply period, frequency band and voltage level of the touch driving signals is modulated to control driving of a driving signal output,
wherein the touch driver circuit sets the first to nth touch electrode groups so that the number of driving electrodes simultaneously driven decreases as the driving electrodes are relatively closer to the touch driver circuit, and the number of driving electrodes simultaneously driven increases as the driving electrodes are farther from the touch driver circuit,
wherein the touch driver circuit sets an overlap area at or about at least one boundary among boundaries of the first to nth touch electrode groups, driving periods of the driving electrodes overlapping one another in the overlap area, and
wherein the driving electrodes disposed in the overlap area are driven by receiving the touch driving signals together with the driving electrodes of previous touch electrode groups, and are continuously driven by receiving the touch driving signals together with the driving electrodes of a current touch electrode group.

11. A display device comprising:
a display panel comprising a display area in which a plurality of sub-pixels is arranged; and
a touch detection module disposed on a front surface of the display panel to sense a user's touch,
wherein the touch detection module comprises:
driving electrodes arranged in parallel;
sensing electrodes arranged to cross the driving electrodes; and
a touch driving circuit configured to supply touch driving signals to the driving electrodes and detect touch sensing signals through the sensing electrodes to detect touch position coordinates,
wherein the touch driver circuit comprises a touch driving controller configured to generate signal characteristic modulation signals such that at least one signal characteristic among supply period, frequency band and voltage level of the touch driving signals is modulated to control driving of a driving signal output,
wherein the touch driver circuit sorts the driving electrodes into a plurality of touch electrode groups based on distances between the touch driver circuit and the driving electrodes, and sequentially supplies the touch driving signals to the driving electrodes of the touch electrode groups, and
wherein the touch driver circuit further comprises an electrode croup setter configured to set the number of the driving electrodes simultaneously driven by the touch driving signals and the touch electrode croups, and to share touch electrode group information with a coordinate data generator.

12. The display device of claim 11,
wherein the driving signal output is configured to modulate the at least one signal characteristic among supply period, frequency band and voltage level of the touch drive signals to supply the touch driving signals to driving electrodes of each of the touch electrode groups;
wherein the touch driver circuit further comprises:
a sensing circuit configured to detect the touch sensing signals through the sensing electrodes.

13. The display device of claim 11, wherein the touch driver circuit sets the first to nth touch electrode groups so that the number of driving electrodes simultaneously driven decreases as the driving electrodes are relatively closer to the touch driver circuit, and the number of driving electrodes simultaneously driven increases as the driving electrodes are farther from the touch driver circuit.

14. The display device of claim 13,
wherein the touch driver circuit sets an overlap area at or about at least one boundary among boundaries of the first to nth touch electrode groups, driving periods of the driving electrodes overlapping one another in the overlap area, and
wherein the driving electrodes disposed in the overlap area are driven by receiving the touch driving signals together with the driving electrodes of previous touch electrode groups, and are continuously driven by receiving the touch driving signals together with the driving electrodes of a current touch electrode group.

15. The display device of claim 13, wherein the touch driver circuit modulates at least one signal characteristic among supply period, frequency band and voltage level of the touch driving signals supplied to the driving electrodes of each of the first to nth touch electrode groups, to supply the respective touch driving signals to the driving electrodes of each of the first to nth touch electrode groups.

16. The display device of claim 13, wherein the touch driver circuit divides supply periods of the touch driving signals supplied to the driving electrodes of each of the first to nth touch electrode groups into first to nth periods from a shortest period to a longest period within at least one frame, generates first to nth period characteristic modulation signals for the different first to nth periods, respectively, and supplies the first to nth touch driving signals in the different first to nth periods, respectively, to the driving electrodes of each of the first to nth touch electrode groups.

17. The display device of claim 13, wherein the touch driver circuit divides frequency bands of the touch driving signals supplied to the driving electrodes of each of the first to nth touch electrode groups into first to nth frequency bands from predetermined lowest frequency band to highest frequency band, generates first to nth frequency characteristic modulation signals for the different first to nth frequency bands, respectively, and supplies the first to nth touch driving signals of the different first to nth frequency bands, respectively, to the driving electrodes of each of the first to nth touch electrode groups.

18. The display device of claim 13, wherein the touch driver circuit divides voltage levels of the touch driving signals supplied to the driving electrodes of each of the first to nth touch electrode groups into first to nth voltage levels from predetermined lowest voltage to highest voltage, divides frequency bands of the touch driving signals supplied to the driving electrodes of each of the first to nth touch electrode groups into first to nth frequency bands from predetermined lowest frequency band to highest frequency band, generates first to nth complex characteristic modulation signals for the different first to nth frequency bands and the different first to nth voltage levels, respectively, and supplies the first to nth touch driving signals of the different first to nth voltage levels and the different first to nth frequency bands, respectively, to the driving electrodes of each of the first to nth touch electrode groups.

19. An electronic device including a display device,
wherein the display device comprises:
a display panel comprising a display area in which a plurality of sub-pixels is arranged; and
a touch detection module disposed on a front surface of the display panel to sense a user's touch,
wherein the touch detection module comprises:
driving electrodes arranged in parallel;
sensing electrodes arranged to cross the driving electrodes; and
a touch driver circuit configured to supply touch driving signals to the driving electrodes and detect touch sensing signals through the sensing electrodes to detect touch position coordinates,
wherein the touch driver circuit comprises a touch driving controller configured to generate signal characteristic modulation signals such that at least one signal characteristic among supply period, frequency band and voltage level of the touch driving signals is modulated to control driving of the driving signal output,
wherein the touch driver circuit sorts the driving electrodes into a plurality of touch electrode groups based on distances between the touch driver circuit and the driving electrodes, and sequentially supplies the touch driving signals to the driving electrodes of the touch electrode groups, and
wherein the touch driver circuit further comprises an electrode group setter configured to set the number of the driving electrodes simultaneously driven by the touch driving signals and the touch electrode groups, and to share touch electrode group information with a coordinate generator.

* * * * *